United States Patent
Imanaka et al.

(10) Patent No.: US 6,168,251 B1
(45) Date of Patent: Jan. 2, 2001

(54) RECORDING APPARATUS AND METHOD FOR CORRECTING OFFSET OF RECORDED PIXELS

(75) Inventors: Yoshiyuki Imanaka, Kawasaki; Ichiro Saito; Teruo Ozaki, both of Yokohama; Toshimori Miyakoshi, Kawasaki; Muga Mochizuki, Yokohama, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/991,441

(22) Filed: Dec. 16, 1997

(30) Foreign Application Priority Data

Dec. 18, 1996 (JP) .................................................. 8-338399

(51) Int. Cl.⁷ .................................................... B41J 29/38
(52) U.S. Cl. .................................................................. 347/9
(58) Field of Search .............................. 347/5, 9, 12, 14, 347/19, 15

(56) References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/56 |
| 4,364,060 | 12/1982 | Jinnai et al. | 347/12 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,675,696 | * 6/1987 | Suzuki | 347/14 |
| 4,723,129 | 2/1988 | Endo et al. | 347/56 |
| 4,740,796 | 4/1988 | Endo et al. | 347/56 |
| 4,956,648 | 9/1990 | Hongo | 347/19 |
| 5,448,269 | * 9/1995 | Beauchamp et al. | 347/19 |

FOREIGN PATENT DOCUMENTS

| | | |
|---|---|---|
| 28 43 064 | 4/1979 | (DE) . |
| 0 310 217 | 4/1989 | (EP) . |
| 0 391 867 | 10/1990 | (EP) . |
| 0 622 220 | 11/1994 | (EP) . |
| 0 655 706 | 5/1995 | (EP) . |
| 54-51837 | 4/1979 | (JP) . |
| 59-123670 | 7/1984 | (JP) . |
| 59-138461 | 8/1984 | (JP) . |
| 62-231756 | 10/1987 | (JP) . |
| 3-2059 | 1/1991 | (JP) . |

* cited by examiner

*Primary Examiner*—John Barlow
*Assistant Examiner*—Juanita Stephens
(74) *Attorney, Agent, or Firm*—Fitzpatrick, Cella, Harper & Scinto

(57) ABSTRACT

Provided are a recording head, recording apparatus, recording method, and recording head which are cartridge using the recording head, capable of correcting the offset of recording dot position in the direction of movement of the recording head, with a simple structure. A plurality of columns of image data corresponding to the plurality of recording devices relating to recording is held and image data corresponding to the column to be recorded is selected from this held image data and recording is thus performed, so that the driving column and recording column can be changed for each nozzle. Consequently, positional offset of dots can be adjusted for each nozzle.

34 Claims, 18 Drawing Sheets

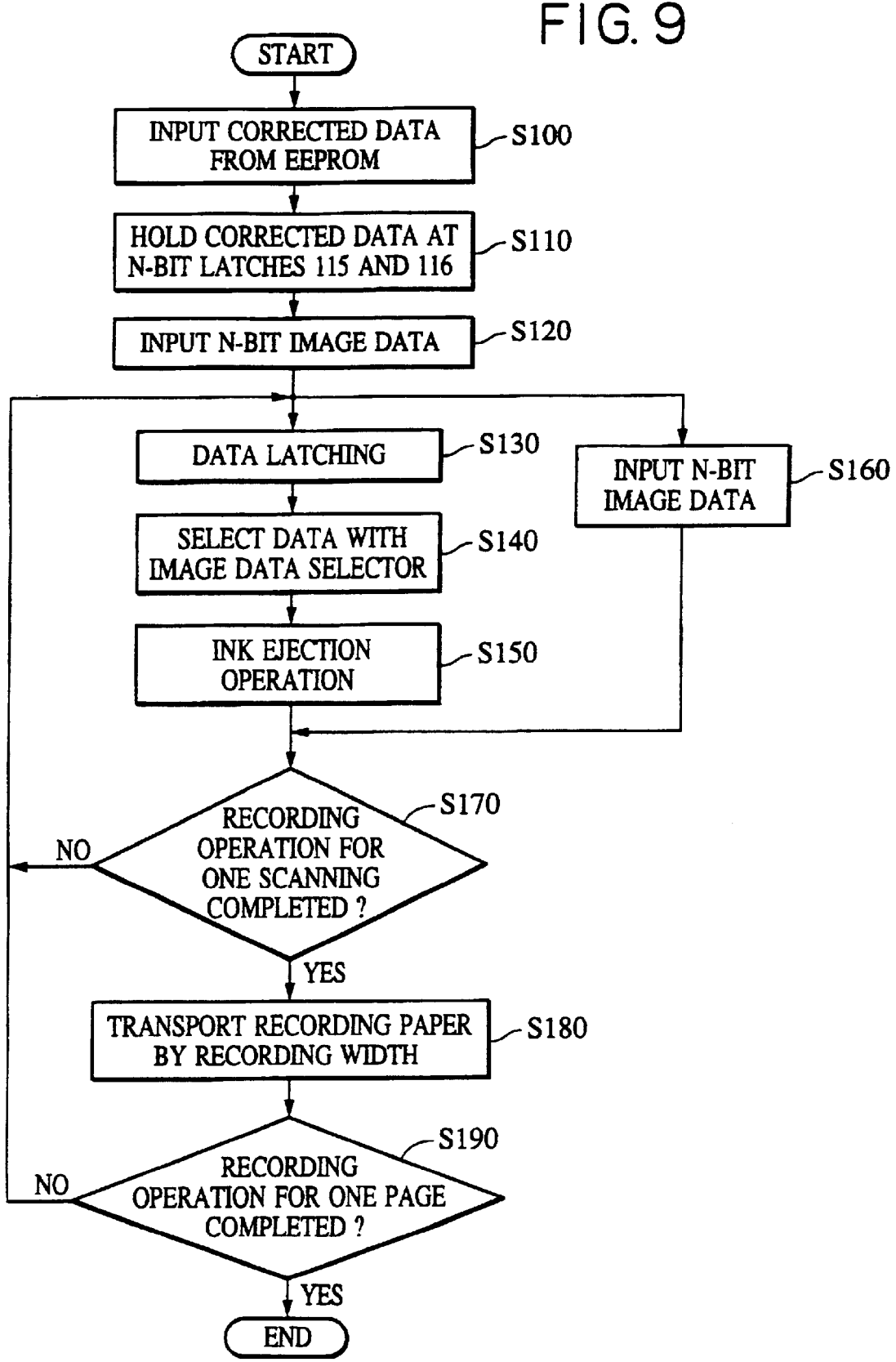

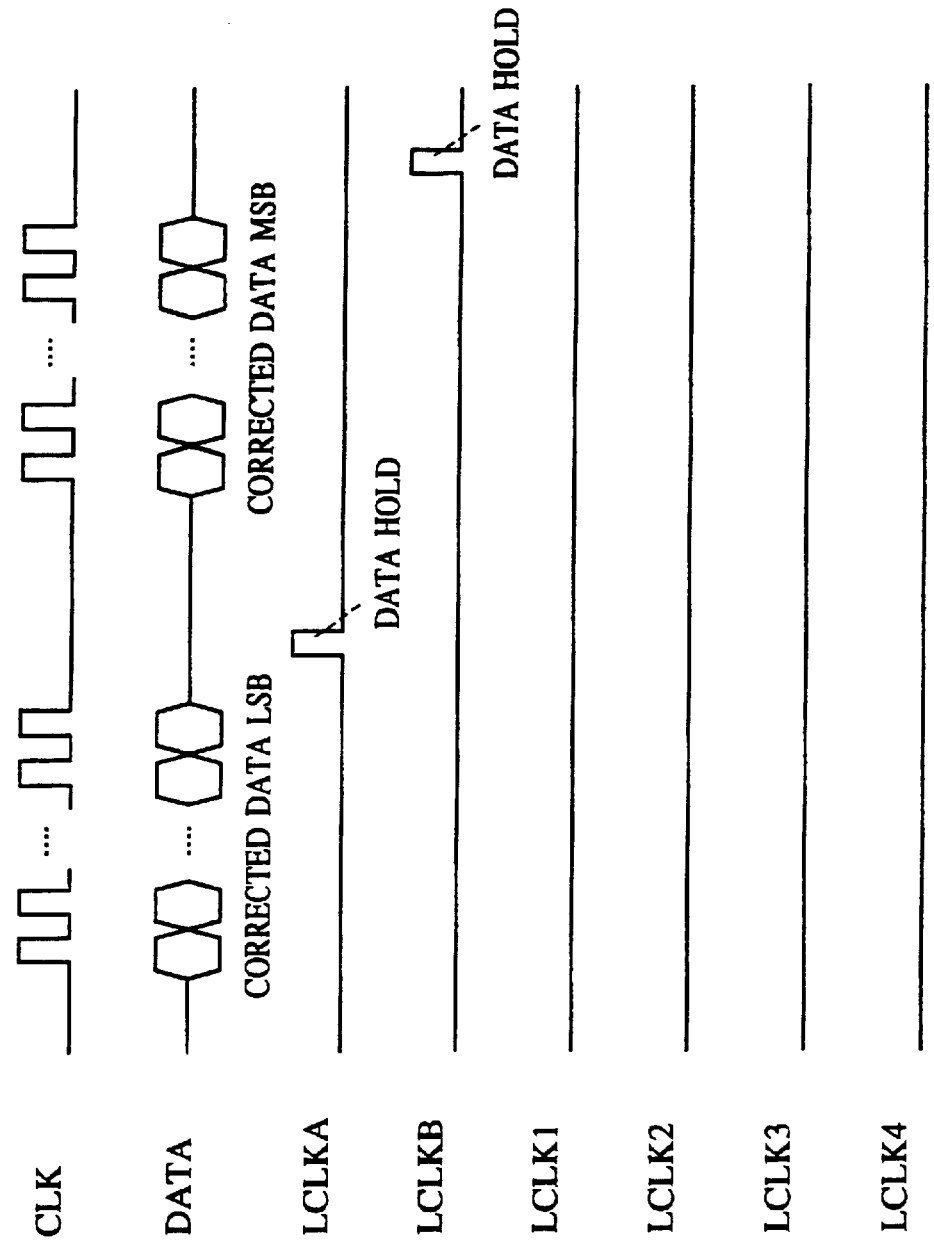

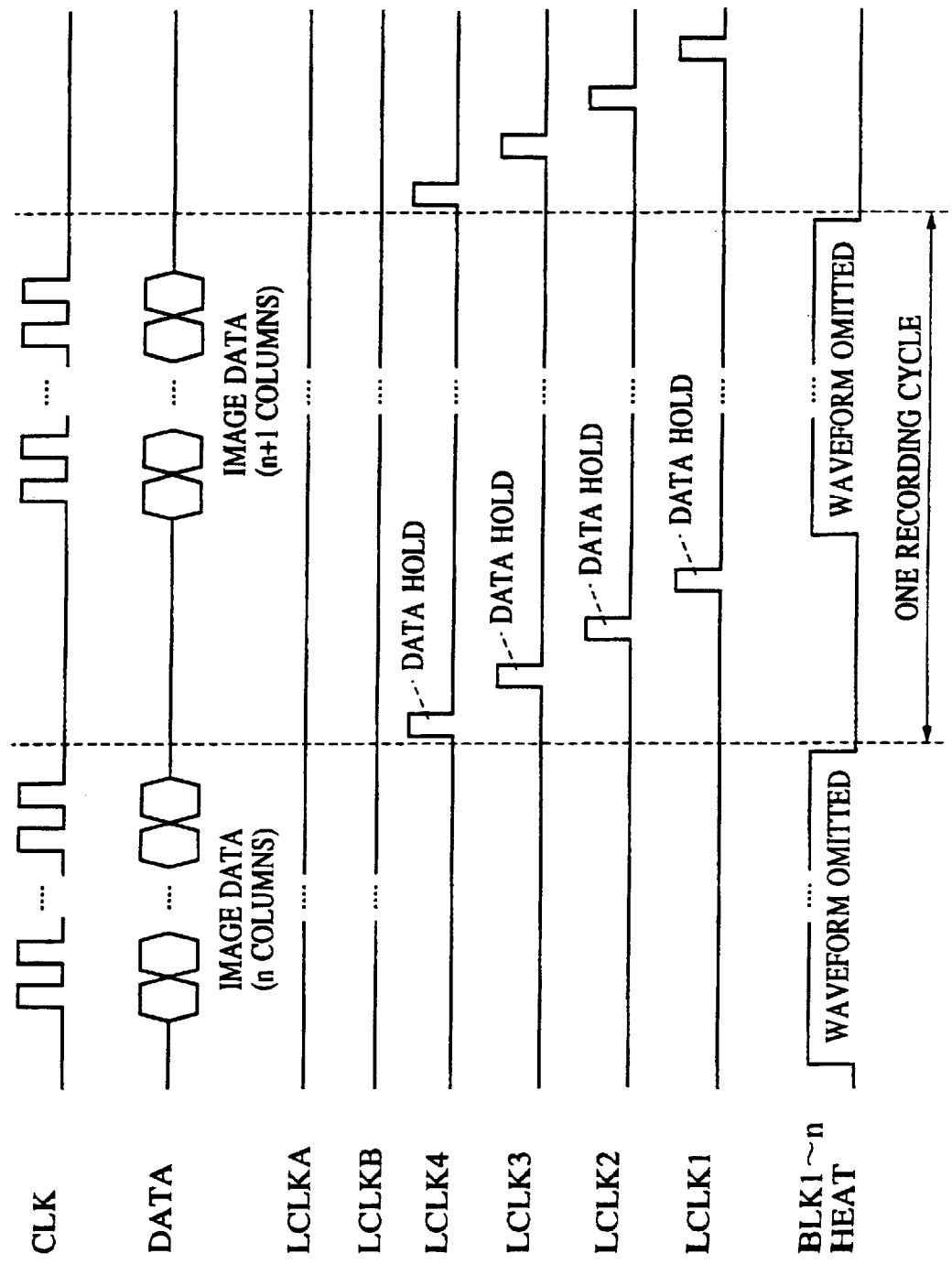

FIG. 13A

| STATE OF EJECTION | 0 | 0 | 0 | 0 | 0 | 0 | 0 | 0 | 0 | 0 : NONE<br>1 : EJECTION |
|---|---|---|---|---|---|---|---|---|---|---|
| 115 | 0 | 1 | 1 | 1 | 0 | 0 | 1 | 1 | 0 | 0 | CORRECTED DATA LSB |
| 116 | 0 | 1 | 1 | 1 | 1 | 1 | 0 | 0 | 1 | 1 | CORRECTED DATA MSB |
| 111 | 0 | 0 | 0 | 0 | 0 | 0 | 0 | 0 | 0 | |
| 112 | 0 | 0 | 0 | 0 | 0 | 0 | 0 | 0 | 0 | |
| 113 | 0 | 0 | 0 | 0 | 0 | 0 | 0 | 0 | 0 | |
| 114 | 0 | 0 | 0 | 0 | 0 | 0 | 0 | 0 | 0 | |
| 704 | 1 | 1 | 1 | 1 | 1 | 1 | 1 | 1 | 1 | |

FIG. 13B

| STATE OF EJECTION | 0 | 1 | 1 | 1 | 0 | 0 | 0 | 0 | 0 | 0 : NONE<br>1 : EJECTION |
|---|---|---|---|---|---|---|---|---|---|---|
| 115 | 0 | 1 | 1 | 1 | 0 | 0 | 1 | 1 | 0 | 0 | CORRECTED DATA LSB |
| 116 | 0 | 1 | 1 | 1 | 1 | 1 | 0 | 0 | 1 | 1 | CORRECTED DATA MSB |
| 111 | 0 | 0 | 0 | 0 | 0 | 0 | 0 | 0 | 0 | |
| 112 | 0 | 0 | 0 | 0 | 0 | 0 | 0 | 0 | 0 | |
| 113 | 0 | 0 | 0 | 0 | 0 | 0 | 0 | 0 | 0 | |
| 114 | 1 | 1 | 1 | 1 | 1 | 1 | 1 | 1 | 1 | |
| 704 | 0 | 0 | 0 | 0 | 0 | 0 | 0 | 0 | 0 | |

FIG. 13C

| STATE OF EJECTION | 0 | 0 | 0 | 0 | 1 | 1 | 0 | 0 | 1 | 1 | 0 : NONE<br>1 : EJECTION |
|---|---|---|---|---|---|---|---|---|---|---|---|
| 115 | 0 | 1 | 1 | 1 | 0 | 0 | 1 | 1 | 0 | 0 | CORRECTED DATA LSB |
| 116 | 0 | 1 | 1 | 1 | 1 | 1 | 0 | 0 | 1 | 1 | CORRECTED DATA MSB |
| 111 | 0 | 0 | 0 | 0 | 0 | 0 | 0 | 0 | 0 | 0 | |
| 112 | 0 | 0 | 0 | 0 | 0 | 0 | 0 | 0 | 0 | 0 | |
| 113 | 1 | 1 | 1 | 1 | 1 | 1 | 1 | 1 | 1 | 1 | |
| 114 | 0 | 0 | 0 | 0 | 0 | 0 | 0 | 0 | 0 | 0 | |
| 704 | 0 | 0 | 0 | 0 | 0 | 0 | 0 | 0 | 1 | 1 | |

FIG. 13D

| STATE OF EJECTION | 0 | 0 | 0 | 0 | 0 | 0 | 1 | 1 | 0 | 0 | 0 : NONE<br>1 : EJECTION |
|---|---|---|---|---|---|---|---|---|---|---|---|
| 115 | 0 | 1 | 1 | 1 | 0 | 0 | 1 | 1 | 0 | 0 | CORRECTED DATA LSB |
| 116 | 0 | 1 | 1 | 1 | 1 | 1 | 0 | 0 | 1 | 1 | CORRECTED DATA MSB |
| 111 | 0 | 0 | 0 | 0 | 0 | 0 | 0 | 0 | 0 | 0 | |
| 112 | 1 | 1 | 1 | 1 | 1 | 1 | 1 | 1 | 1 | 1 | |
| 113 | 0 | 0 | 0 | 0 | 0 | 0 | 0 | 0 | 0 | 0 | |
| 114 | 0 | 0 | 0 | 0 | 0 | 0 | 0 | 0 | 0 | 0 | |
| 704 | 0 | 0 | 0 | 0 | 0 | 0 | 0 | 0 | 1 | 1 | |

RECORDING APPARATUS AND METHOD FOR CORRECTING OFFSET OF RECORDED PIXELS

BACKGROUND OF THE INVENTION

1. Field of the Invention

The present invention relates to a recording head, a recording control method using the recording head, and a recording apparatus using the recording head and the recording head cartridge thereof, and particularly relates to, e.g., a recording head which performs recording by the ink-jet method, a recording control method using the recording head, and a recording apparatus using the recording head and the recording head cartridge thereof.

2. Description of Related Art

Recording using the ink-jet method has been gathering much interest recently, due to factors such as the noise during recording being extremely low to the point of being negligible, being capable of high-speed recording, and further being capable of fixing the recorded image on so-called "plain paper" without requiring special processing.

Particularly, the recording method disclosed in Japanese Patent Laid-Open No. 54-51837 and German Deutsche Offenlegungsschrift DT-OS 28 43 064 is different from the others in that thermal energy is applied to a liquid such as ink thereby obtaining the force for ejecting the liquid.

That is, according to the recording methods disclosed in the above publications, the liquid which is subjected to thermal energy undergoes a state transition accompanying a sudden increase in volume, the liquid is ejected from orifices at the tip of the recording head owing to force based on the change in state, whereby discharged droplets are formed, and recording is performed by the droplets adhering to the recording medium.

Particularly, the recording method described in DT-OS 28 43 064 is not only applicable to so-called drop-on-demand recording in an extremely efficient manner, but also allows for easy realization of full-line type recording heads which have a recording width equivalent to the entire width of the recording medium and have high orifice density. Accordingly, this arrangement is advantageous in that an image with high resolution and high quality can be obtained at high speed.

Now, recording heads of recording apparatuses to which such a recording method is applied are comprised of: orifices provided for ejecting liquid, liquid channels which are connected to the orifices and form part of the thermal application portion in which the thermal energy is applied to the liquid, and a substrate having electro-thermal converters (heat-generating elements) for generating thermal energy.

In recent years, advances in technology have allowed for not only a plurality of heat-generating elements to be mounted on the substrate, but also a plurality of drivers which drive the respective heat-generating elements, a shift register which temporarily stores image data of the same number of bits as the number of heat-generating elements in order to take the image data input serially from the recording apparatus and transfer this image data to the drivers in parallel, and logic circuits such as a latch circuit which temporarily latches the data output from the shift register, all on the same substrate.

FIG. 15 is a block diagram illustrating the configuration of a logic circuit of a known recording head which has an N number of heat-generating elements (recording devices).

In FIG. 15, reference numeral 700 denotes a substrate, 701 denotes heat-generating elements, 702 denotes power transistors, 703 denotes an N-bit latch circuit, and 704 denotes an N-bit shift register. Also, 715 denotes a sensor which monitors the resistance of the heat-generating elements 701 and the temperature of the substrate 700, and also a heater which maintains the heat of the substrate 700. Either a plurality of the sensor and heater may be provided, or the sensor and heater may be formed integrally. Reference numerals 705 through 714 and 716 are input/output pads. More specifically, 705 denotes a clock input pad for inputting clock (CLK) for operating the shift register 704, 706 denotes an image data input pad for inputting image (DATA) serially, 707 denotes a latch input pad for inputting latch clock (LTCLK) for holding the image data at the latch circuit 703, 708 denotes a drive signal input pad for inputting heat pulses (HEAT) for external control of the time that the power transistors 702 are turned on and driving current is supplied to the heat-generating element 701, 709 denotes driving electric source input pad for inputting driving electric source (VDD=3–8 V, generally 5V) for driving the logic circuit, 710 denotes a ground terminal (VSS), 711 denotes a heat-generating element electric source input pad for inputting electric source (VH) for driving the heat-generating element 701, 712 denotes a reset input pad for inputting reset signals (RST) for initializing the latch 703 and shift register 704, and 713 is an H ground terminal for the heat-generating element driving electric source.

Also, 714-(1) and 714-(2) are a monitor signal output pad and an input pad for control signals (SENS1, SENS2) for driving the sensor and heater. Further, 716-(1) through 716-(n) are block selection signals (BLK1, BLK2, . . . , BLKn) for block selection upon dividing the N number of heat-generating elements into an n number of blocks and performing time-division driving. Finally, 717 denotes an AND circuit which computes the logical sum of the latch circuit 703, heat signal (HEAT), and the block selection signals (BLK1, BLK2, . . . , BLKn).

The driving sequence of a recording head such as described above will now be described. In the following description, image data (DATA) is understood to be binary data of 1-bit per pixel.

First, image data (DATA) is serially output from the recording apparatus proper which is mounted with the recording head, in a manner synchronous with the clock (CLK), and the data is taken into the shift register 704. Next, the image data (DATA) is temporarily stored in the latch circuit 703, and ON/OFF is output by the latch circuit 703, corresponding to the value of the image data value ("0" or "1").

Once the heat pulse (HEAT) and block selection signals are thus input, ON output signals are supplied from the latch circuit 703, and the power transistors corresponding to the block-selected heat-generating elements by the clock selection signal are driven during the time that the heat pulse (HEAT) is turned ON, thereby providing electrical current to the corresponding heat-generating elements, thus executing the recording operation.

Since block selection signals (BLK1, BLK2, . . . , BLKn) are used, the number of heat-generating elements 701 driven simultaneously decrease according to the time division driving per block, doing away with the need to supply excessive current to the recording head, and preventing generation of noise due to switching on great electrical current.

A recording head such as described above is mounted on a carriage in the recording apparatus, and moves with the reciprocal movement of the carriage (the movement direction thereof being referred to as the "main scanning direction"), discharging ink onto the recording paper according to the recording data. With each reciprocal movement of the carriage, the recording paper is transported by the width of the recording head (the movement direction thereof being referred to as the "sub-scanning direction"). An image is recorded on the recording paper by repeating such operation over the entirety of the sheet of recording paper.

FIG. 16 is a signal timing chart representing the recording head executing recording for one recording cycle. Here, the term "one recording cycle" refers to one recording operation that the recording head performs in the same position in the main scanning direction. For example, in the event that value of the recording data equivalent to the recording width in the one recording cycle is "1", all of the heat-generating elements of the recording head are driven.

With reference to FIG. 16, the reset signal (RST) is input before the recording operation, initializing the latch 703 and the shift register 704, following which the image data (DATA) is input according to the clock (CLK). On the other hand, the image data (DATA) input to the shift register 704 is latched to the latch 703 by the latch clock (LTCLK).

Now, each of the bits of image data (DATA) latched to the latch 703 are input to one terminal of the corresponding AND circuit 717. Here, heat pulses (HEAT) are input at a certain cycle. On the other hand, block selection signals are sequentially input into the AND circuit 717 in the order of BLK1, BLK2, BLK3, ..., BLKn, and heater electric current flows to the heat-generating element 701 corresponding to the power transistor 702 to which "1" has been input as the result of logic calculation of the AND circuit.

In recent years, there has been a tendency to increase the number of nozzles provided to a single recording head, and recording heads with a recording length exceeding 100 mm have been developed. In the case of recording heads with such long recording widths, the linearity of the material comprising the recording head and the irregularities in the nozzles cause the position of the ink droplets ejected from the orifices landing on the recording medium such as the recording paper to be offset from the ideal position, and in practice, there is high probability that the amount of offset will be 1 pixel or greater, which is considered to be the tolerable margin of error for recording quality. Such heads which have amount of offset of 1 pixel or greater cannot be shipped as products, so this problem leads to decrease in yield, and directly affects the production cost of recording heads.

Regarding such offset, it is generally agreed that offset in the row direction of the nozzles of the recording head (generally the sub-scanning direction) can be sufficiently handled by providing a number of nozzles equal to or exceeding the recording width to the recording head beforehand, and shifting the nozzles used according to the offset that occurs.

However, regarding offset in the direction vertical to the nozzle row direction (generally the direction of movement of the recording head, i.e., the main scanning direction), the only correction method that has been provided is such regarding color recording wherein a plurality of recording heads are arranged in the main scanning direction to perform recording, such as proposed in Japanese Patent Laid-Open No. 62-231756, in which the relative position of each recording head is corrected in increments of pixels. There has not been an effective method for correcting offset of one pixel (referred to as "one column" in the main scanning direction) or more for each nozzle. Particularly, recording heads with long recording widths have great offset for each nozzle, and this has been the cause of lower yield.

FIG. 17 is a diagram comparing the actual points of discharge with ideal points of discharge as a recording head having ten ink-ejecting nozzles (nozzles No. 1 through 10) moves in the main scanning direction while ejecting ink to record a character pattern "1A". In FIG. 17, "○" represents ideal ejection points, while "●" represents actual ejection points.

As shown in FIG. 17, the character pattern indicated by the group of "●" is offset in the main scanning distance by one pixel or greater in so many places that the recording quality is deteriorated to the extent that the character pattern "1A" is no longer readable. An arrangement can be conceived in order to correct such offset close to or exceeding one column in which the image data is corrected on the side of the recording apparatus. This corrected data is transferred to the recording head, but such a method complicates the circuitry of the recording apparatus and more memory is required for the correction, so as a result the overall cost of the apparatus increases. Consequently, this cannot be considered to be an effective correction method.

SUMMARY OF THE INVENTION

Accordingly, the present invention has been made in light of the problems of the above-described known art, and it is an object of the present invention to provide a recording head, recording apparatus, recording control method, and recording head cartridge using the recording head, capable of correcting the offset of recording dot position in the direction of movement of the recording head, with a simple structure.

The recording head according to the present invention for achieving the above object is comprised as follows:

A recording head relatively scanning a recording medium and recording a plurality of columns comprises: a plurality of recording devices for recording; storage means for holding image data for a plurality of the columns corresponding with a plurality of recording devices related to the recording; a selection circuit for selecting, from image data corresponding to a plurality of columns stored in the storage means, image data corresponding to the column for which recording is to be performed; and driving means for driving the plurality of recording devices, based on the selected image data.

Also, the recording apparatus according to the present invention is a recording apparatus relatively scanning a recording medium and recording a plurality of columns, the recording apparatus comprising: a plurality of recording devices for recording; storage means for holding image data for a plurality of the columns corresponding with a plurality of recording devices related to the recording; a selection circuit for selecting, from image data corresponding to a plurality of columns stored in the storage means, image data corresponding to the column for which recording is to be performed; driving means for driving the plurality of recording devices, based on the selected image data; a recording head having driving means; and means for supplying image signals to the head.

Also, a recording method relatively scanning a recording medium with a head having a plurality of recording devices and recording a plurality of columns comprises the following steps: a step for supplying a plurality of recording devices relating to recording with corresponding column data; a step for storing image data for a plurality of the columns in the storage means; a step for selecting, from image data corresponding to a plurality of columns stored in the storage means, image data corresponding to the column for which recording is to be performed; and a step for driving the plurality of recording devices based on the selected image data.

Also, a recording head comprises: an N number of heat-generating elements arrayed in one row; an N number of driving circuits for driving the heat-generating elements; an N-bit shift register which temporarily stores N bits of image data; an n number of first N-bit latch circuits for storing correction data prepared for correcting array offset of the N number of heat-generating elements; a 2n number of second N-bit latch circuits for holding 2n×N bits of image data stored in the N-bit shift register; and a control circuit for performing control so that one piece of image data held in the 2n number of second N-bit latch circuits is selected for each of the N number of heat-generating elements based on corrected data stored in the first N-bit latch circuit, and the N number of driving circuits are driven so as to perform recording operation.

This may further comprise EEPROM for storing correction data.

Also, n includes "2", and in this case, the control circuit further comprises a selector for selecting one piece of data from the image data held by four of the second N-bit latch circuits corresponding with each of an N number of heat-generating elements, based on correction data expressed in 2 bits regarding the N number of heat-generating elements stored in two of the first N-bit latch circuits.

Now, the recording head may comprise an ink-jet recording head which records by discharging ink, or may comprise a recording head which records by discharging ink using thermal energy, further comprising a thermal energy converter for generating thermal energy to apply to the ink.

Further, the recording head may be configured such that the 2n number of second N-bit latch circuits are serially connected, and N-bits of image data are transferred to the neighboring circuit each time a latch clock is input.

Incidentally, the correction data is generated by mounting the recording head to an external device, test-recording a certain pattern, and subjecting the recorded pattern to image processing.

Also, according to another invention, a recording apparatus which records by using the recording head constructed as described above comprises: scanning means for reciprocally moving the recording head in a first direction; transporting means for transporting recording medium in a second direction which is the direction in which the heat generating elements of the recording head are arrayed and is a direction vertical to the first direction; correction data setting means for outputting the correction data to the n number of first N-bit latch circuits for holding, before the recording operation; transferring means for transferring the image data to the recording head in increments of N bits; and hold control means for performing control such that a latch clock is transmitted for each transfer increment by the transfer means, and such that image data sequentially transferred to the 2n number of second N-bit latch circuits is held in increments of N bits.

Now, correction data is data which instructs shifting of the recording position in the first direction, in increments of the recording head heat-generating elements, and the shift increment is the size of one recording dot determined by the recording resolution regarding the first direction.

Also, the recording apparatus may further comprise EEPROM for storing the correction data.

Further, the recording apparatus may comprise: test operation control means for controlling the recording head so as to record a certain pattern on recording medium; reading means for reading the recording data from the recording medium upon which the pattern has been recorded; image processing means for performing image processing to the means read by the reading data; and generating means for generating correction data based on the results of the image processing.

Accordingly, the reading means may comprise: light-emitting means for irradiating light upon the recording medium, such as an LED; and light-receiving means for receiving the reflected light of the light and converting the reflected light into electric signals, such as a CCD.

According to yet another invention, a recording control method which records by using the recording head comprising the following steps: a correction data setting step for outputting the correction data to the n number of first N-bit latch circuits for holding, before the recording operation; a transferring step for transferring the image data to the recording head in increments of N bits; a hold control step for performing control such that a latch clock is transmitted for each transfer increment by the transfer means, and such that image data sequentially transferred to the 2n number of second N-bit latch circuits is held in increments of N bits; and a control step for performing control so that one piece of image data held in the 2n number of second N-bit latch circuits is selected for each of the N number of heat-generating elements based on correction data stored in the n number of first N-bit latch circuits, and the N number of driving circuits are driven so as to perform recording operation.

According to the above construction, the present invention performs recording so that a certain pattern is test-recorded beforehand, correction data is generated taking into consideration the recording properties of the recording head generated by performing image processing of the recorded pattern, this correction data being stored in an EEPROM or the like, this correcting data being output beforehand to an n number of first N-bit latch circuits so as to be held, following which image data is transferred to the recording head in increments of N bits, a latch clock is transmitted for each transfer increment, control is made so that the image data which has been sequentially transferred to the 2n number of second N-bit latch circuits is held in increments of N bits, and so that one piece of image data held in the 2n number of second N-bit latch circuits is selected for each of the N number of heat-generating elements based on corrected data stored in the first N-bit latch circuit, and the N number of driving circuits are driven so as to perform recording operation.

Moreover, according to a further invention, the recording head comprises: an N number of recording devices arrayed in one row; a holding circuit for holding image data for a plurality of rows of the N number of recording devices; a memory circuit which stores correction data relating to offset of recording dots recorded by the N number of heat-generating elements; and a control circuit for performing control so that one piece of data held in the holding circuit is selected from the plurality of rows of image data held in the holding circuit for each of the N number of recording devices, based on correction data stored in the memory circuit, and the N number of recording devices are driven so as to perform recording operation.

Now, the recording head may comprise EEPROM as a memory circuit, may comprise an ink-jet recording head which records by discharging ink, or may comprise a recording head which records by discharging ink using thermal energy, further comprising a thermal energy converter for generating thermal energy to apply to the ink.

Also, still another invention comprises a recording head cartridge comprising a recording head of the above construction and an ink container for holding ink in order to supply to the recording head.

BRIEF DESCRIPTION OF THE DRAWINGS

FIG. 9 is a flowchart illustrating the correction and recording operations using the correction data;

FIG. 10 is a timing chart of the various signals used for holding the correction data in the latch circuit block 101 with a built-in correction circuit;

FIG. 12 is a timing chart of the various signals used for performing offset correction and recording operation;

FIGS. 13A to 13D are diagrams illustrating the state of data holding of the latch circuit of the latch circuit block 101 with a built-in correction circuit at the time of recording operation;

DESCRIPTION OF THE PREFERRED EMBODIMENTS

The preferred embodiments of the present invention will now be made in detail with reference to the attached drawings.

General description of the main apparatus

Figure 1:
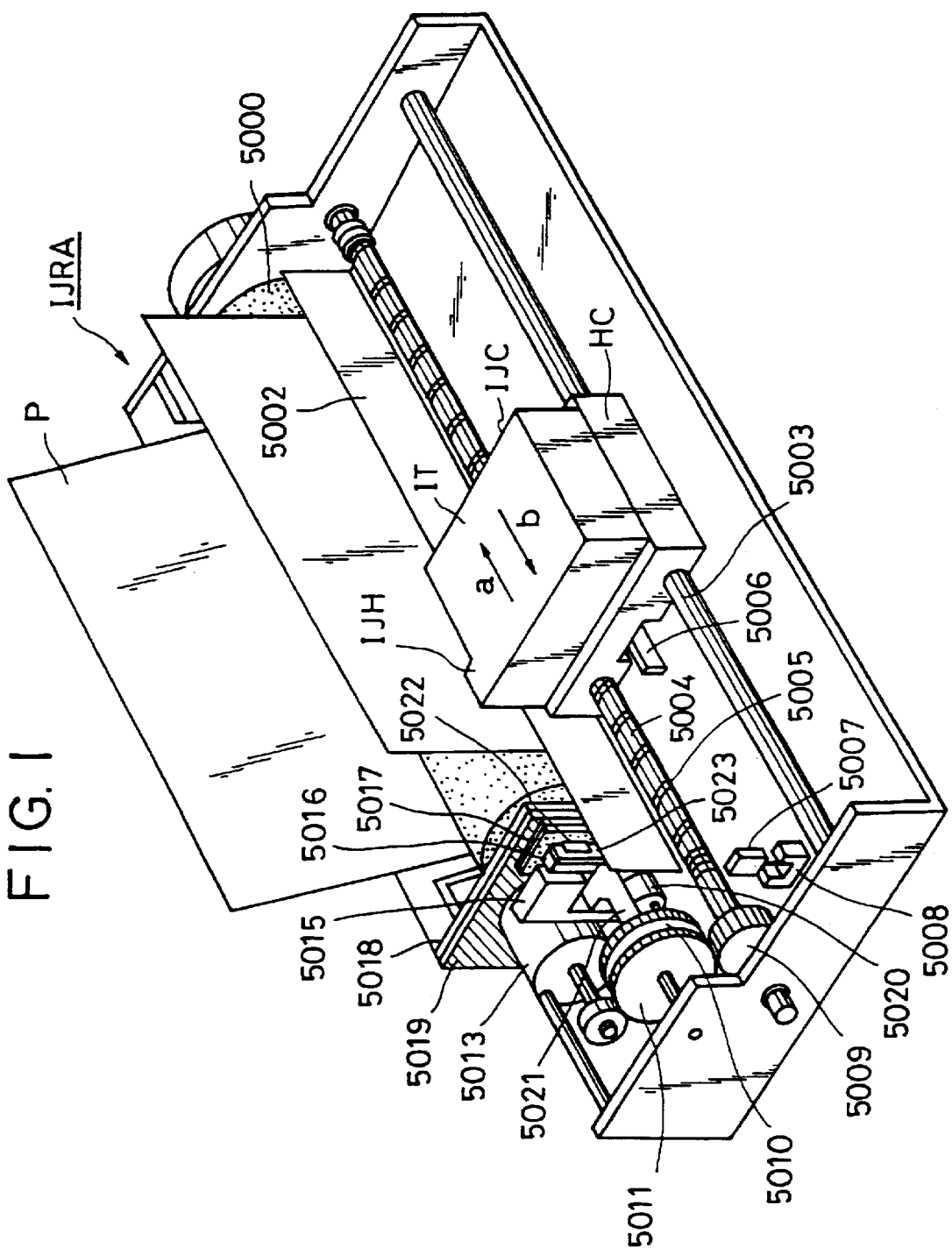
FIG. 1 is an external perspective view illustrating the principal components of the structure of an ink-jet printer IJRA which is a representative embodiment of the present invention.

FIG. 1 is an external perspective view illustrating the principal components of the structure of an ink-jet printer IJRA which is a representative embodiment of the present invention. In FIG. 1, a carriage HC which engages a spiral groove 5005 of a lead screw 5004 which rotates synchronously with forward or reverse rotation of a driving motor 5013 via driving force transmitting gears 5009 through 5011 has a pin (unshown), and reciprocally moves in the direction of the arrows a and b, supported by a guide rail 5003, thereby causing the head mounted thereupon to move relative to the recording medium. The carriage HC is provided with an integral-type ink-jet cartridge IJC with a recording head IJH and ink tank IT built in. 5002 denotes a paper pressing plate, and presses the recording paper P against a platen 5000 over the movement direction of the carriage HC. 5007 and 5008 denote photo-couplers, which serve as home position detectors for confirming the presence of a carriage lever 5006 in this range and switching the rotational direction of the motor 5013. 5016 is a member supporting a cap member 5022 which caps the front plane of the recording head IJH, and 5015 denotes a suction device which performs suction of the inside of this cap, thereby executing suction recovery of the recording head via opening 5023 within the cap. 5017 denotes a cleaning blade, and 5019 is a member which enables this blade to move forward and reverse, these members being supported by a main unit supporting plate 5018. It is needless to say that the blade is by no means restricted to the form shown here; rather, a known cleaning blade can be applied to the present invention. Also, 5021 is a lever for starting suction for the suction recovery, which moves in a manner accompanying the movement of a cam 5020 engaging the carriage, and motion control of the driving force from the driving motor is performed by a known transmitting mechanism such as a clutch or the like.

The embodiment is arranged so that such capping, cleaning, and suction recovery can be performed at the corresponding position of each by means of operation of the lead screw 5005 at the time the carriage is at the home position, but the present embodiment is not restricted to such; rather an arrangement wherein the desired operations are performed at a known timing can be applied to the present embodiment.

Also, the ink-jet printer IJRA of the construction such as described above is provided with an automatic recording sheet feeder (unknown), for automatically supplying recording paper P.

Figure 2:
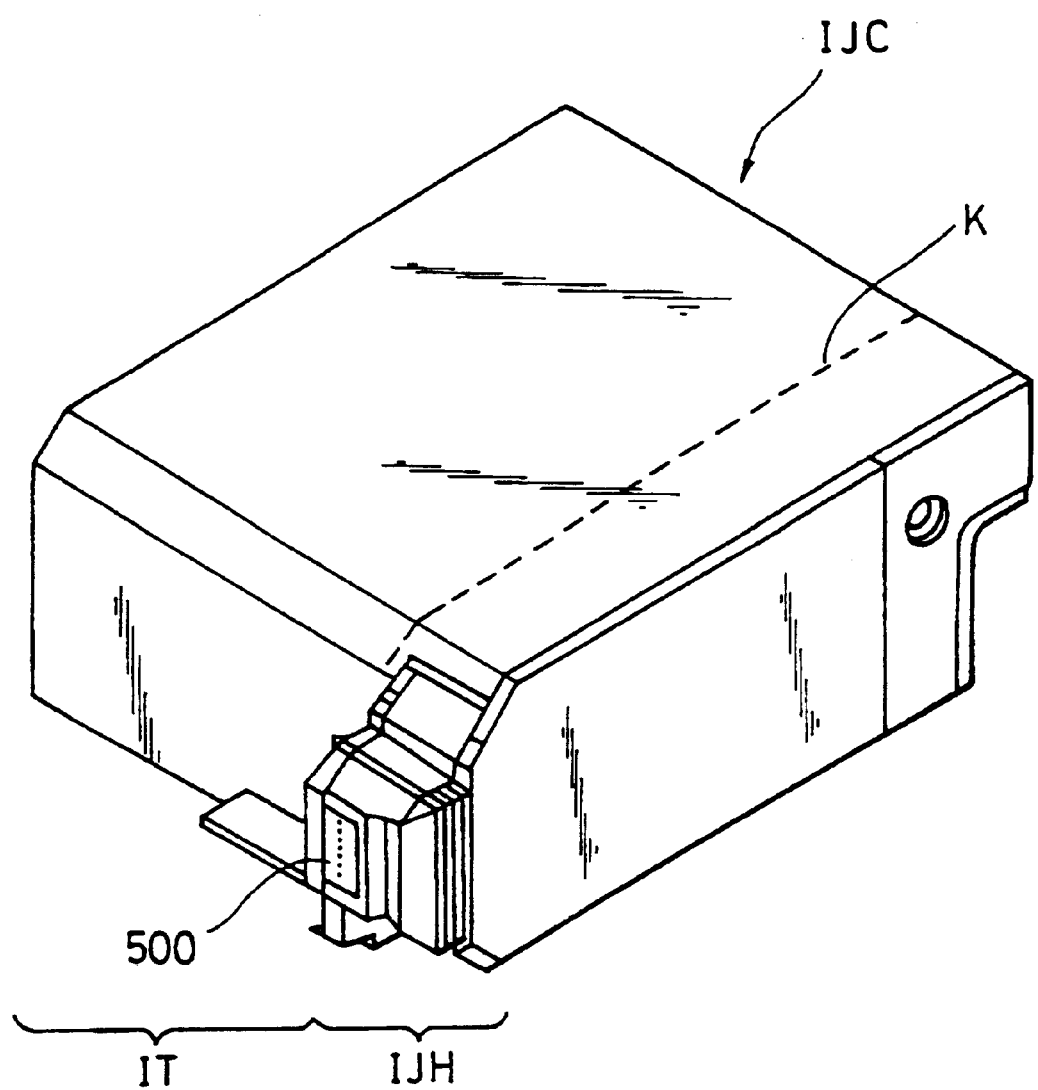
FIG. 2 is an ink-jet cartridge IJK which is constructed such that the recording head IJH and ink tank IT are separable.

Further, the ink-jet cartridge IJC need not necessarily be constructed as an integral-type cartridge with a recording head IJH and ink tank IT built in; rather, an ink cartridge such as shown in FIG. 2 may be applied instead.

That is to say, the ink-jet cartridge IJC of the construction shown in FIG. 2 is such that the recording head IJH having a plurality of discharge orifices 500 and the ink tank IT holding ink for supplying to the recording head IJH are separably contacting at the boundary line K. This ink-jet cartridge is provided with electrical contacts for receiving electric signals from the side of the carriage HC when mounted thereon, and the recording head IJH is driven by these electric signals. Also, a fibrous or porous ink absorption member is provided within the ink tank IT which comprises the ink cartridge, thereby holding ink.

Description of control configuration

Next, the control configuration for executing the recording control of the above-described apparatus will be described.

Figure 3:
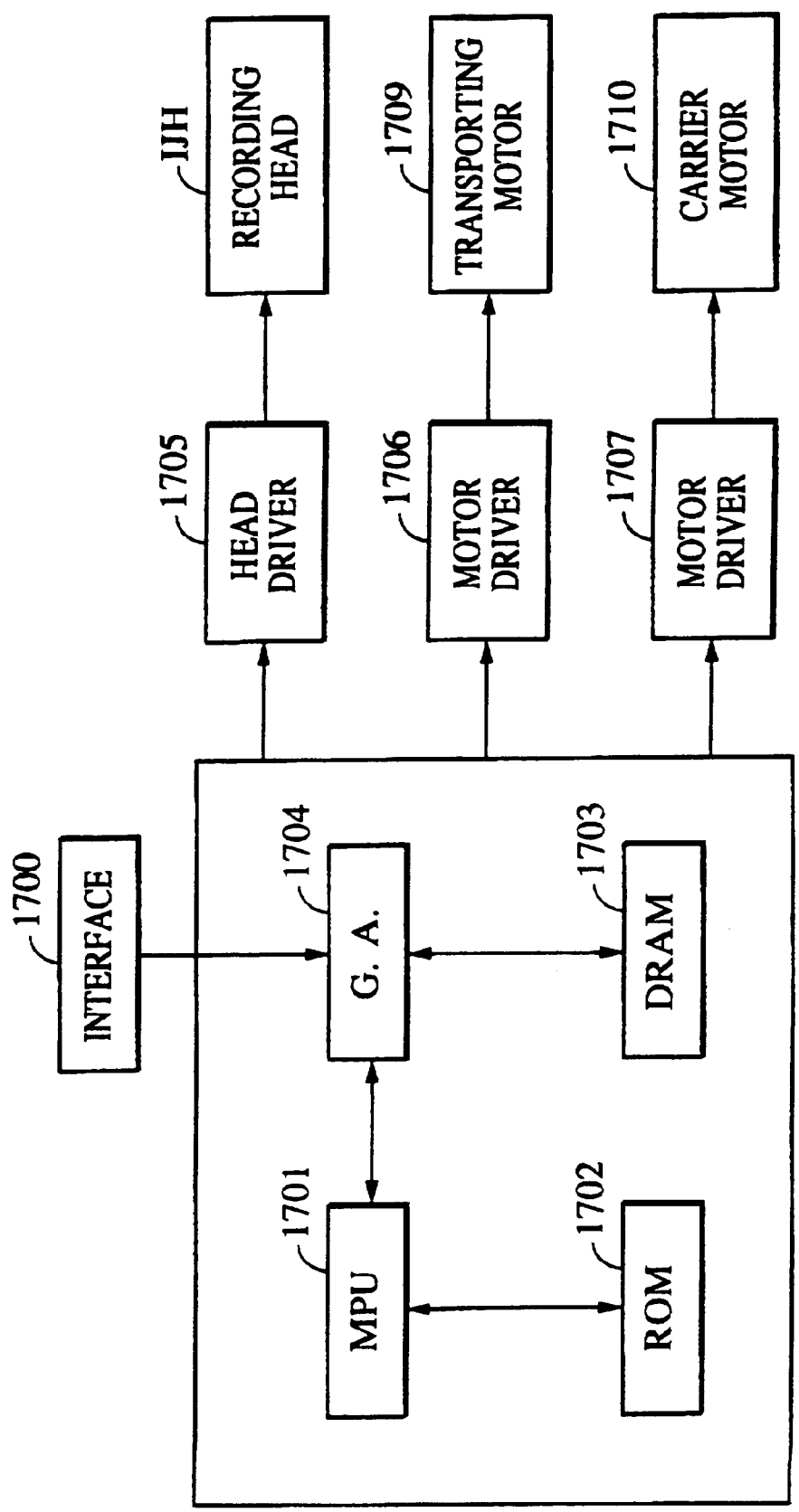
FIG. 3 is a block diagram illustrating the configuration of the control circuit for the ink-jet printer IJRA.

FIG. 3 is a block diagram illustrating the configuration of the control circuit for the ink-jet printer IJRA. In this Figure illustrating the control circuit, 1700 denotes an interface for inputting recording signals, 1701 denotes an MPU, 1702 denotes ROM for storing control programs executed by the MPU 1701, and 1703 denotes DRAM for storing various types of data (the above recording signals, recording data to be supplied to the recording head IJH, etc.). 1704 is a gate array (G.A.) for performing supply control of recording data to the recording head IJH, and also for controlling data transfer between the interface 1700, MPU 1701, and RAM 1703. 1710 denotes a carrier motor for transporting the recording head IJH, and 1709 denotes a transporting motor for transporting the recording paper. 1705 is a head driver for driving the recording head IJH, and 1706 and 1707 respectively denote motor drivers for driving the transporting motor 1709 and carrier motor 1710.

Now, description will be made of the operation of the above construction. At the point that recording signals enter the interface 1700, the recording signals are converted into recording data for printing between the gate array 1704 and the MPU 1701. Then, the motor drivers 1706 and 1707 are driven, and also the recording head IJH is driven according to recording data sent to the head driver 1705, thus performing recording.

Internal construction of the recording head IJH

Figure 4:
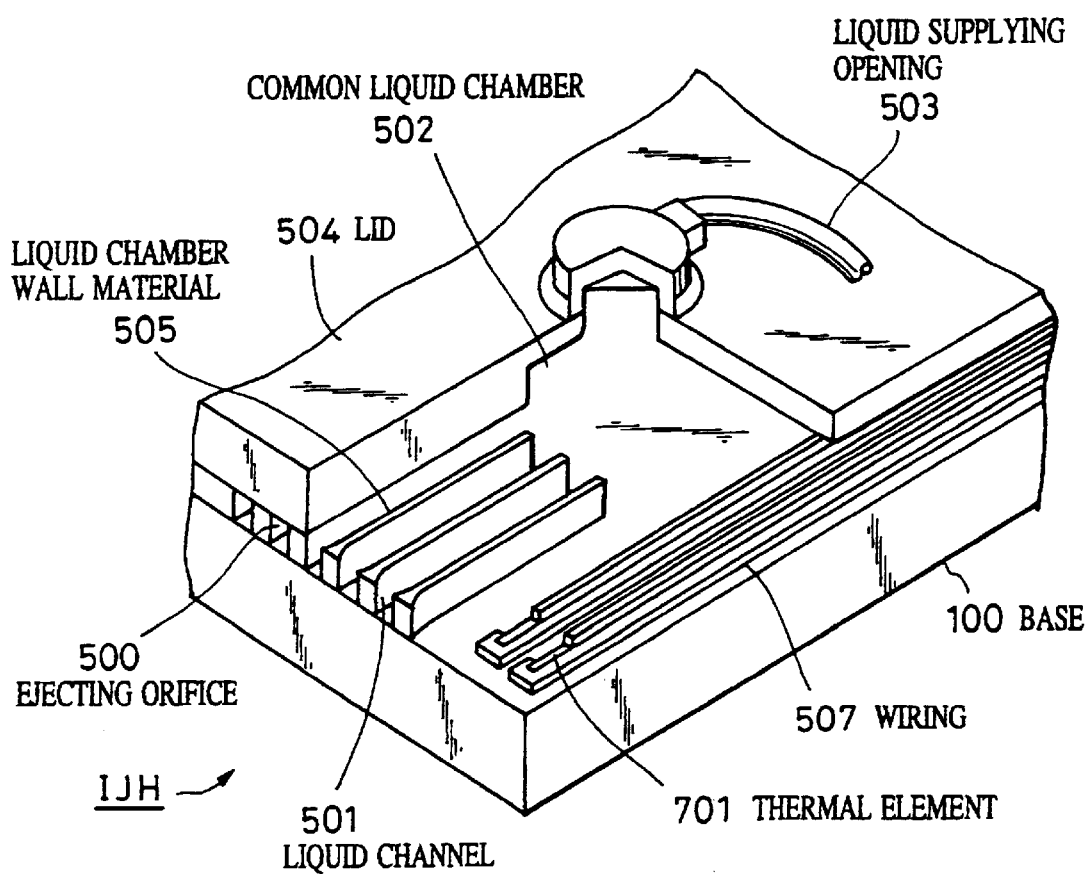
FIG. 4 is a partial cutaway perspective view illustrating the internal construction of a recording head mounted to the recording apparatus shown in FIG. 1.

FIG. 4 is a partial cutaway perspective view illustrating the internal construction of a recording head mounted to the recording apparatus shown in FIG. 1.

In FIG. 4, 100 denotes a substrate upon which a logic circuit is mounted, 500 denotes orifices for discharging ink, 501 denotes ink channels, 502 denotes a common ink chamber into which a plurality of ink channels are connected, this chamber temporarily holding the ink, 503 denotes an ink supplying opening for supplying ink from an unshown ink tank, 504 denotes a lid, 505 denotes liquid channel wall material forming the lid 504 and the ink channels 501, 506 denotes heat-generating elements serving as recording devices, and 507 denotes wiring connecting the logic circuit and heat-generating elements 701.

The logic circuit and wiring 507 are formed on the substrate 100 using semiconductor manufacturing processes, and attached to this are the lid 504 to which the ink supplying opening 503 is provided and also the liquid channel walls 505, thus forming the recording head IJH. Then, ink from the ink supplying opening 503 is stored in the common ink chamber 502 therein, so that ink is supplied to each of the liquid channels, and driving the heat-generating elements 701 discharges ink from the discharge orifices 500.

Configuration of the recording head IJH

Figure 5:
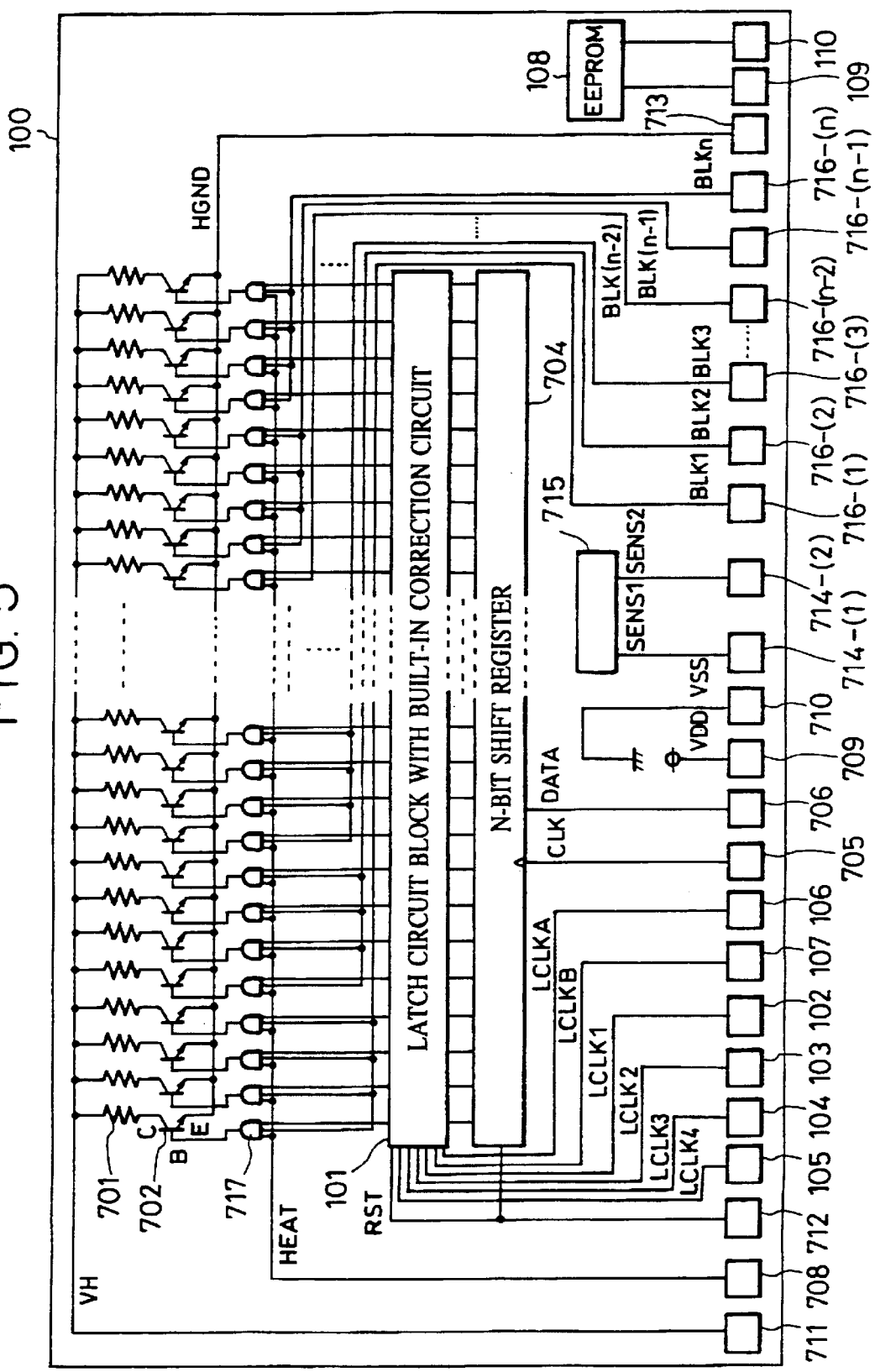
FIG. 5 is a block diagram illustrating the configuration of the logic circuit of the recording head IJH.
Figure 15:
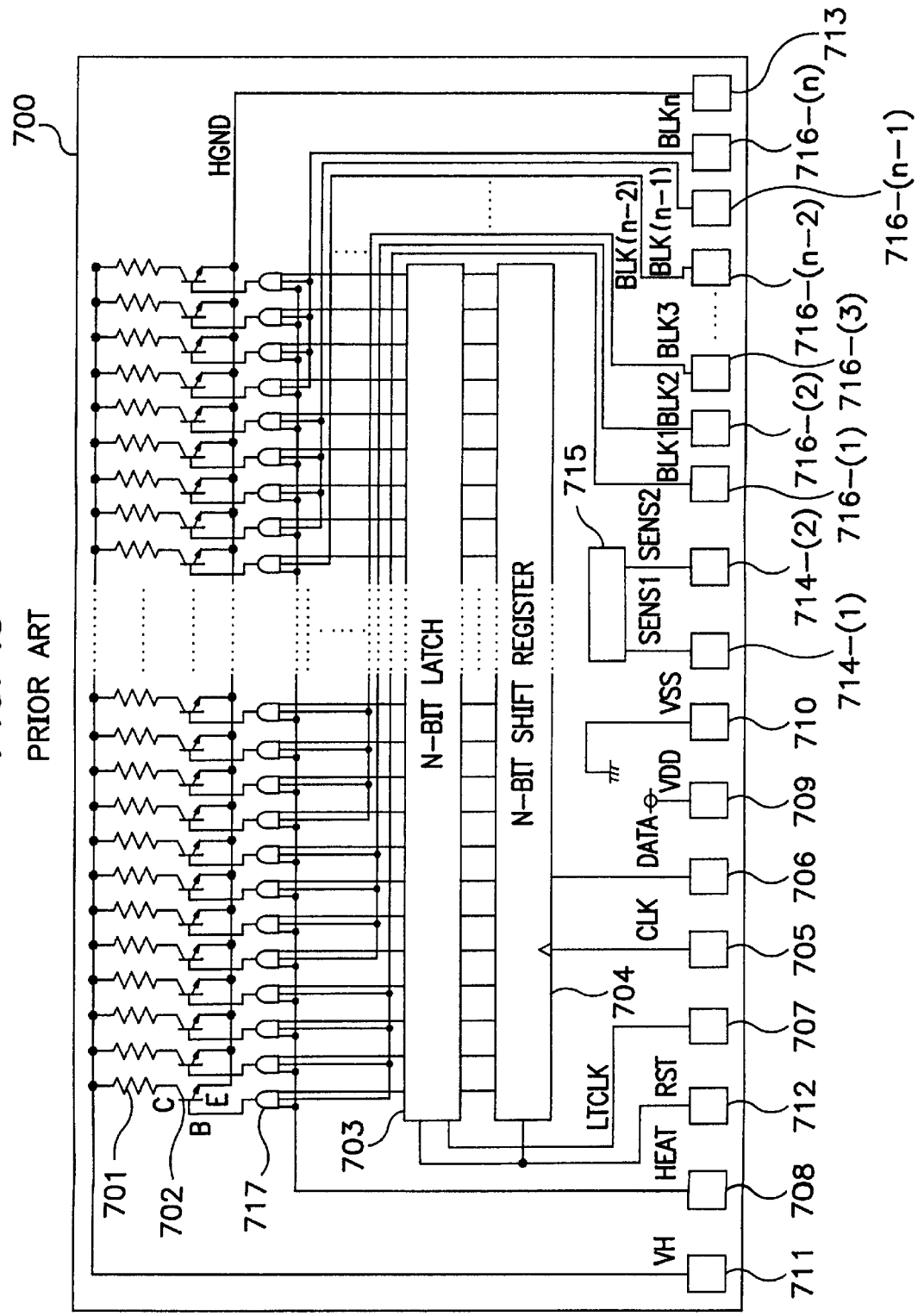
FIG. 15 is a block diagram illustrating the configuration of the logic circuit of a known recording head.
Figure 16:
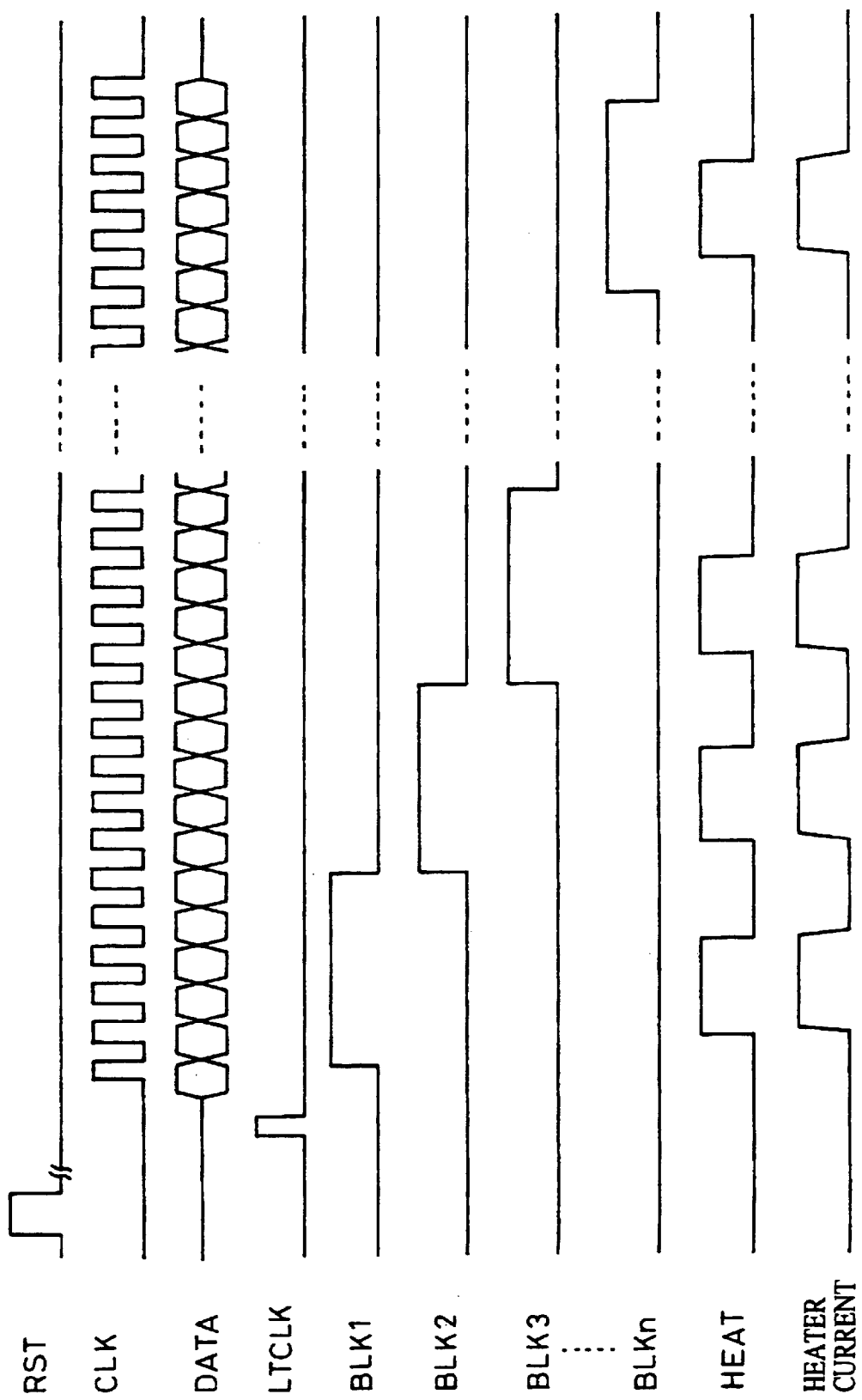
FIG. 16 is a signal timing chart illustrating the time that the recording head executes one recording cycle of recording.

FIG. 5 is a block diagram illustrating the configuration of the logic circuit of the recording head IJH. In FIG. 5, the description of the components which are the same as those of the known logic circuit shown in FIG. 15 will be omitted here.

In FIG. 5, 101 denotes a latch circuit block with a built-in correction circuit which includes six latch circuits serving as storage means, for performing offset correction in the main scanning direction of the image data by these latch circuits, 102 through 107 denote signal input pads for supplying to the six latch circuits latch clocks (LCLK1, LCLK2, LCLK3, LCLK4, LCLKA, LCLKB), 108 denotes EEPROM for storing correction data for correcting offset between the column which should be recording and the column which is recorded, as described later, 109 denotes a data output pad for reading correction data from the EEPROM 108, and 110 is a data input pad for writing correction data to the EEPROM 108.

Figure 6:
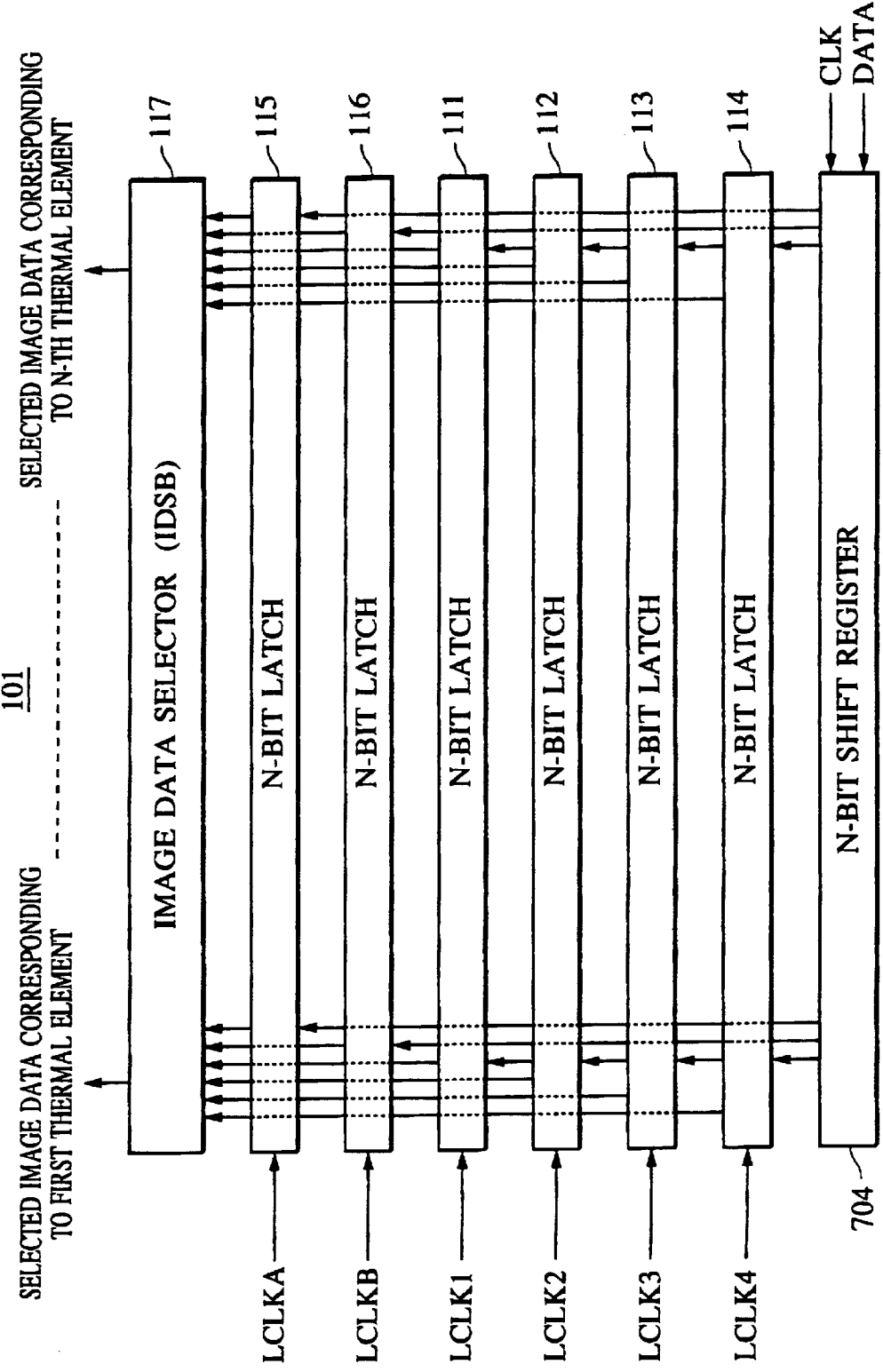
FIG. 6 is a block diagram illustrating the detailed configuration of the latch circuit block 101 with a built-in correction circuit.

FIG. 6 is a block diagram illustrating the detailed configuration of the latch circuit block 101 with a built-in selected information holding circuit.

In FIG. 6, 111 through 116 denote N-bit latch circuits, and 117 denotes an image data selector (IDSB). Comparing this construction with the known example, the known example has an arrangement provided with one N-bit latch circuit for an N-bit shift register, but the present embodiment is provided with four N-bit latch circuits 111 through 114 serving as storage means for holding a plurality of lines of image data. The N-bit latch circuits 111 through 114 each following the latch clocks (LCLK 1 through 4) in the following manner, for example: if these signals are "High", data is taken in, and if "Low", the data is held.

Also, the relation of mutual input and output of data of the N-bit latch circuits 111 through 114 is as shown in FIG. 6.

That is, the N-bit latch circuit 114 inputs image data from the N-bit shift register 704 according to the latch clock (LCLK4), the N-bit latch circuit 113 inputs image data from the N-bit latch circuit 114 according to the latch clock (LCLK3), the N-bit latch circuit 112 inputs image data from the N-bit latch circuit 113 according to the latch clock (LCLK2), and the N-bit latch circuit 111 inputs image data from the N-bit latch circuit 112 according to the latch clock (LCLK1). The output of each latch is connected to the image data selector (IDSB) 117.

Further, the N-bit latch circuits 115 and 116 are used for holding data necessary for selecting a piece of image data in increments of nozzles for a plurality of columns connected to the image data selector (IDSB) 117, aside from the N-bit latch circuits 111 through 114. That is, in the present embodiment, in order to select one column of data from the four columns of data in increments of nozzles (heat-generating elements), 2-bit selection data is required per nozzle, so two N-bit latch circuits are used. N-bit latch circuits 115 and 116 hold data from the N-bit shift register 704 according to latch clocks (LCLKA and LCLKB). Also, the output of the N-bit latch circuits 115 and 116 is connected to the image data selector (IDSB) 117, in addition to the N-bit latch circuits 111 through 114.

Then, at the image data selector (IDSB) 117 which selects image data corresponding to the column (line) to be recorded, one piece of image data output from the N-bit latch circuits 111 through 114 in increments of individual nozzles, according to the output from the N-bit latch circuits 115 and 116, is output to the AND circuit 717.

Processing necessary for offset correction

Next, description of processing necessary for performing offset correction using the recording head of the above-described construction will be made with reference to the flowcharts shown in FIG. 7 and FIG. 9.

(1) Generating and writing correction data

Figure 17:
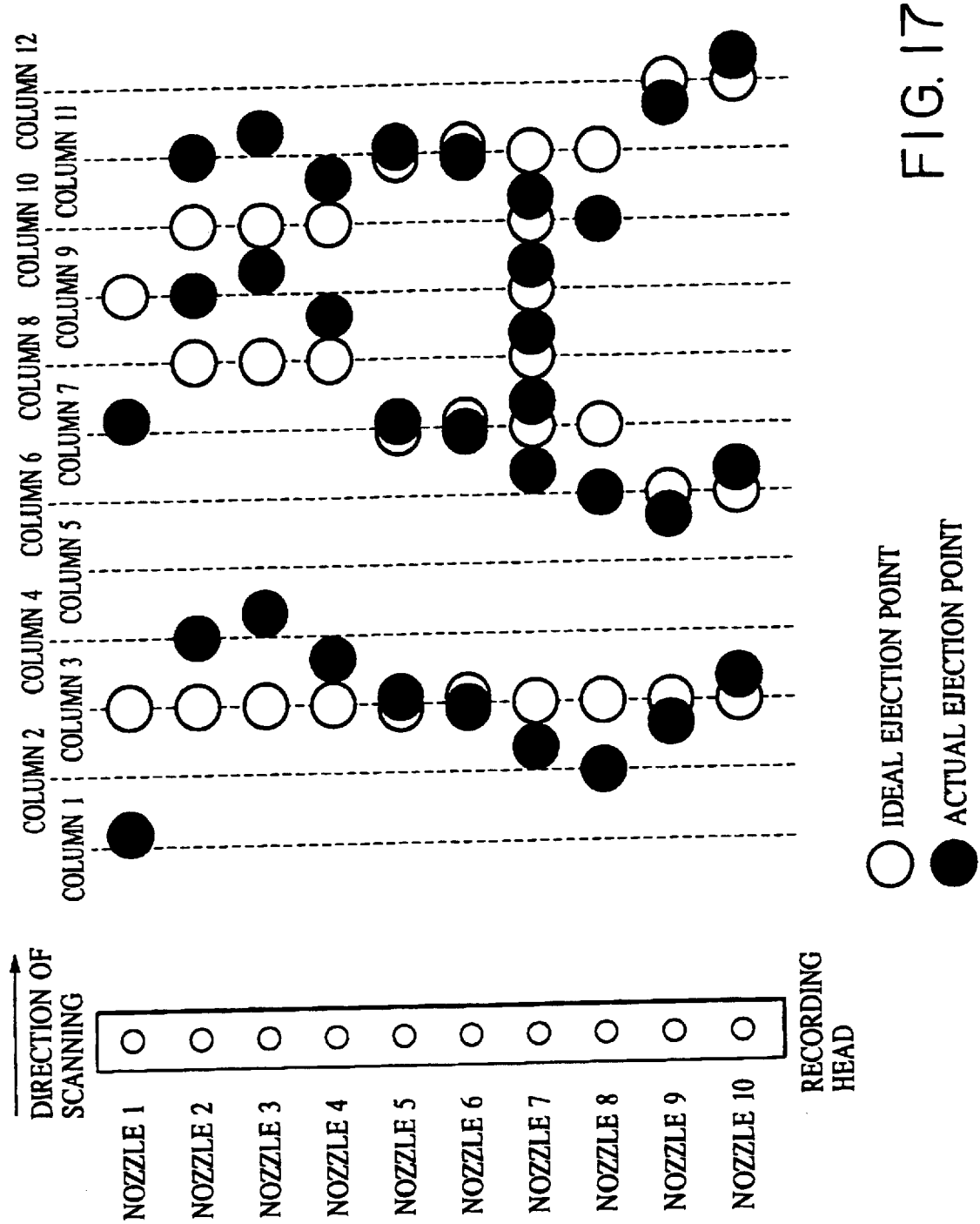
FIG. 17 is a diagram comparing the actual points of discharge with ideal points of discharge in recording the character pattern "1A".

First, at the end of the recording head manufacturing process, a recording head correction apparatus such as described in Japanese Patent Laid-Open No. 7-32337 (filed on Feb. 23, 1995) is used for recording a test pattern with the manufactured head on recording medium, and generating correction data from the recorded pattern. That is, according to the flowchart shown in FIG. 7, first, the recording head is mounted to the recording head correction device in step S10, and a character test pattern of "1A" such as shown in FIG. 17 is recorded on recording paper in step S20. Subsequently, in step S30, this test pattern is read with a CCD camera or the like, and further, in step S40, image processing is performed to the read information. This image processing yields information regarding how many pixels in the main scanning direction the actual ink ejecting points are offset as compared to the ideal ejecting points. For example, in the event of a recording head having ten nozzles as shown in FIG. 17, offset to the right side of the ideal ejecting point is represented by "+" and offset to the left side is represented by "−". Accordingly, nozzle No. 1 is "−2", nozzle No. 2 is "+1", and so forth through nozzle No. 10 which is "0".

Then, in step S50, the offset thus obtained is converted into 2-bit data. Here, −2→00 (MSB, LSB), −1→01, 0→10, and +1→11 has been applied. This 2-bit data is used as the data for offset correction in the later-described actual recording process. Before the actual recording operation, this data is input to the N-bit latches 115 and 116, and one of the four columns of data is selected for each nozzle based on this data. In the present embodiment, the image data held in the N-bit latch 111 is selected when the value to the data is "−2(00)", the image data held in the N-bit latch 112 is selected when the value to the data is "−1(01)", the image data held in the N-bit latch 113 is selected when the value to the data is "0(10)", and the image data held in the N-bit latch 114 is selected when the value to the data is "+1(11)".

Finally, in step S60, the obtained correction data is written to the EEPROM 108.

Now, in the event that the recording head is not replaceable, but is fixed within the recording device, there is no need to provide the EEPROM to the recording head, and the obtained correction data can be stored in an EEPROM provided within the recording device.

Figure 8:
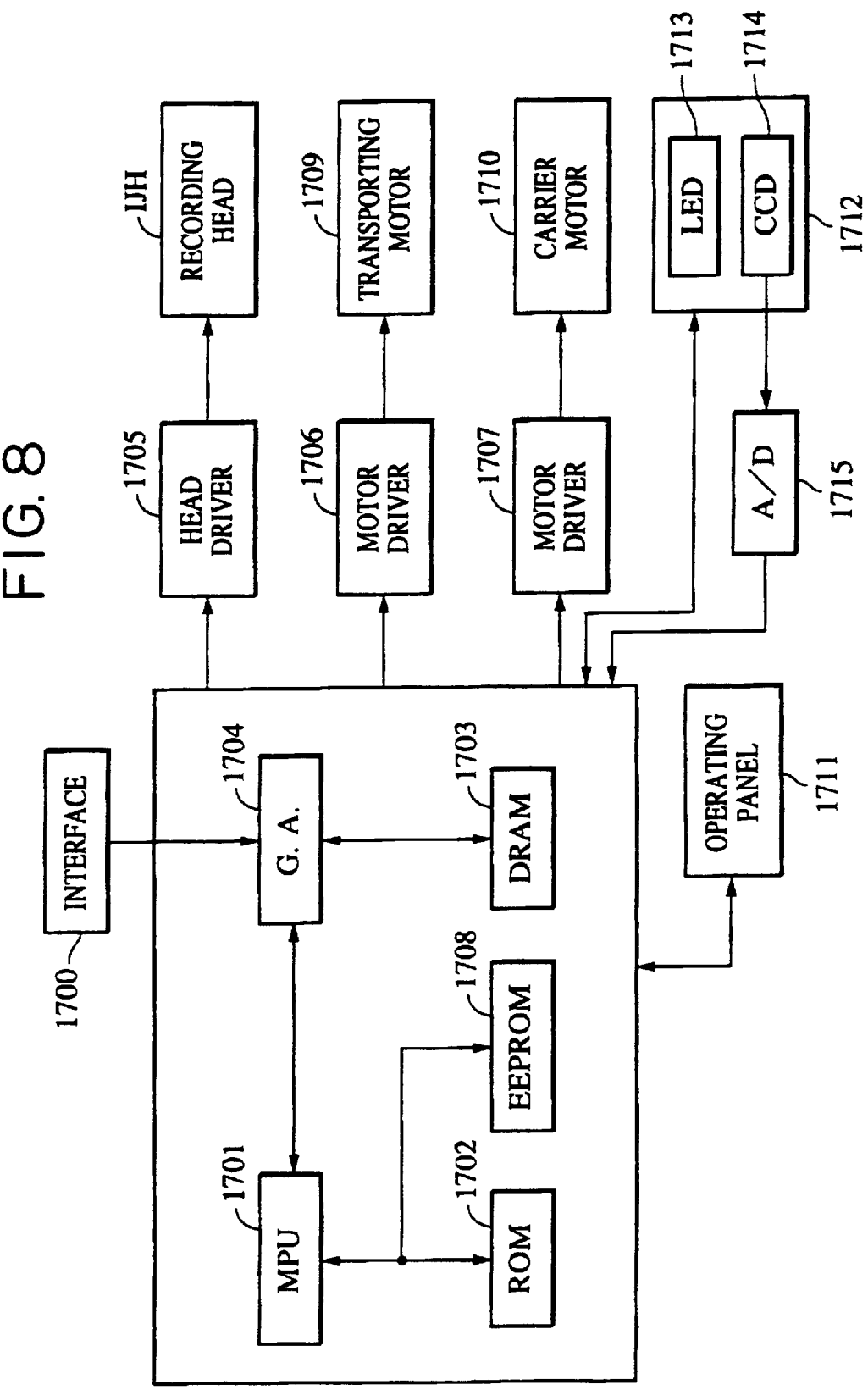
FIG. 8 is a block diagram illustrating the control circuit of the ink-jet printer IJRA having offset correction functions.

Although the above embodiment has been described with reference to an arrangement wherein generation and storage of the correction data is performed at the end of the manufacturing process, the present invention is by no means restricted to such an arrangement; rather, the recording apparatus may be constructed such as shown in FIG. 8, wherein the recording apparatus proper is provided with functions for generating correction data therein, thereby enabling the user to adjust offset periodically.

Figure 7:
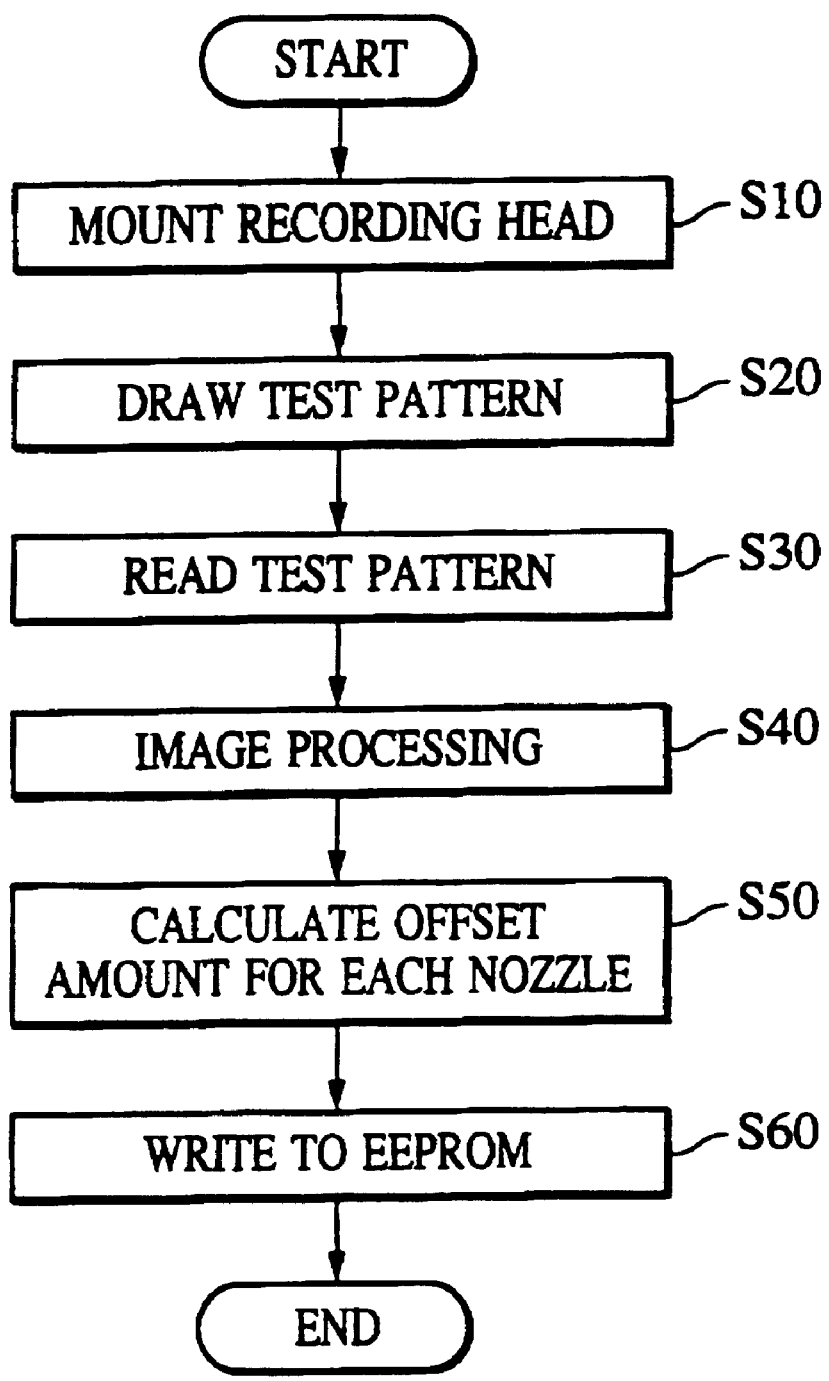
FIG. 7 is a flowchart illustrating the generating and writing processing of correction data.

At this time, processing such as shown in FIG. 7 is performed in the recording apparatus. For example, the user instructing generation of correction data from the operating panel 1711 executes processing similar to that of FIG. 7 by means of the MPU 1708, and the correction data obtained as a result thereby is stored in the EEPROM 1708. However, upon executing this performing, recording paper is fed to the recording apparatus, and the test pattern is drawn on the recording paper by means of the recording head IJH. Then, the test pattern is read by an optical scanner 1712 attached to the side surface of the carriage HC, for example. The optical scanner 1712 is comprised of an LED 1713 which irradiates light upon the recording paper, and a CCD 1714 which receives the reflected light and converts this into electric signals, the output from the CCD 1714 being converted into digital signals by means of an A/D converter 1715.

(2) Offset correction and recording using correction data

Once correction data is generated as described above and the data is stored in the recording head IJH or in the EEPROM of the recording apparatus, actual recording is performed. Processing such as illustrated in FIG. 9 is executed at this time.

That is, in step S100 correction data is input from the EEPROM (here, EEPROM 108 provided to the recording head IJH). Then, in step S110, the corrected data is held in the N-bit latches 115 and 116. In order to achieve this, first, as shown in FIG. 10, the LSB side of the correction data comprised of 2 bits is transmitted to the N-bit shift register 704 based on the clock (CLK), that data is held in the N-bit latch 115 by the latch clock (LCLKA), following which the MSB side of the correction data comprised of 2 bits is transmitted to the N-bit shift register 704 based on the clock (CLK), that data is held in the N-bit latch 116 by the latch clock (LCLKB). In this case, the other latch clocks (LCLK 1 through 4) are not used.

Figure 11A:
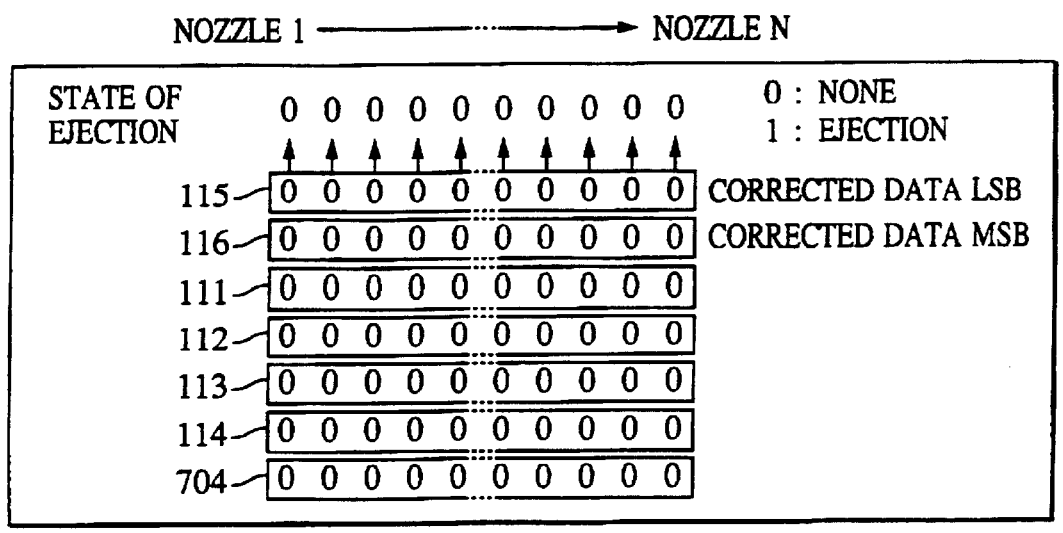
FIGS. 11A and 11B are diagrams illustrating the state of data holding of the latch circuit of the latch circuit block 101 with a built-in correction circuit at the time of processing holding of correction data.
Figure 11B:
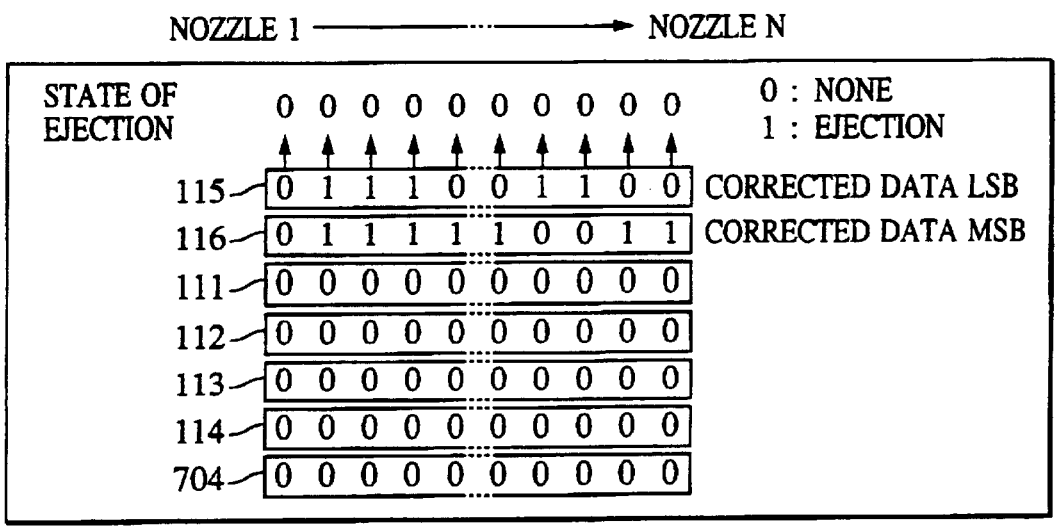

According to operation such as described above, the state of the N-bit latches 115 and 116 changes from the initial state shown in FIG. 11A (the state of all latches "0") to the data holding state shown in FIG. 11B.

Next, in step S120, the actual image data is input to the N-bit shift register 704 according to the clock (CLK). Input of this image data (DATA) is performed according to the clock (CLK) as shown in FIG. 12, and accordingly, data is set to the N-bit shift register 704 as shown in FIG. 13A. Further, in step S130, the input data is latched to the N-bit latch 114 by the latch clock (LCLK4), as shown in FIG. 12. Thus, data is set to the N-bit latch 114 as shown in FIG. 13B. At this time, following input of the latch clock (LCLK4), the other latch clocks (LCLK3, LCLK2, and LCLK1) are also sequentially input, and as described above, the data held in N-bit latch 114 is transferred to N-bit latch 113, the data held in N-bit latch 113 is transferred to N-bit latch 112, and the data held in N-bit latch 112 is transferred to N-bit latch 111.

This latch data is output to the image data selector (IDSB) 117, and in step S140, only the latch data for nozzles having a correction data value of "11" in binary expression are selected and output to the AND circuit 117 serving as an image data selector, based on the correction data held in the N-bit latches 115 and 116, as shown in FIG. 13B, and further in step S150, the heat-generating elements 701 are driven according to the data output to the AND circuit, block selection signals (BLK 1 through n), and heat signal (HEAT), as shown in FIG. 12, thereby ejecting ink droplets from the nozzles.

Now, during operation of the steps S130 through S150, generally the next N bits of image data are input to the N-bit shift register 704 in step S160. However, in order to simplify description in FIG. 13, the next N bits of image data are dealt with as being non-existent.

Next, in step S170, confirmation is made whether the recording head has completed one scan of recording operation, and in the event that judgment is made that one scan of recording operation has been completed, the flow proceeds to step S170, in which the recording paper is transported by a distance corresponding to the width of the recording head IJH, and further proceeds to step S190. In step S190, confirmation is made whether the recording head has completed one page of recording operation, and in the event that judgment is made that one page of recording operation has been completed, the flow ends.

Conversely, if judgment is made in the steps S170 or S190 that one scan or one page of recording operation has not been completed, the flow returns to step S130 and the recording operation continues.

Now, making description regarding the image data input to the aforementioned N-bit shift register 704 and latched to the N-bit latch 114 by the latch clock (LCLK4), at the point that the flow returns to step S130, the image data is transferred from N-bit latch 114 to N-bit latch 113 by the next latch clock (LCLK3 in this case), as shown in FIG. 13C. Then, in step S140, as shown in FIG. 13C, only the latch data for nozzles having a correction data value of "10" in binary expression are selected and output to the AND circuit 117, and further in step S150, recording operation is executed by ejecting ink in the same manner.

Further, the image data is transferred from N-bit latch 113 to N-bit latch 112 by the next latch clock (LCLK2 in this case), as shown in FIG. 13D, and in step S140, as shown in FIG. 13D, only the latch data for nozzles having a correction data value of "01" in binary expression are selected and output to the AND circuit 117, and further in step S150, recording operation is executed by ejecting ink in the same manner.

Figure 14:
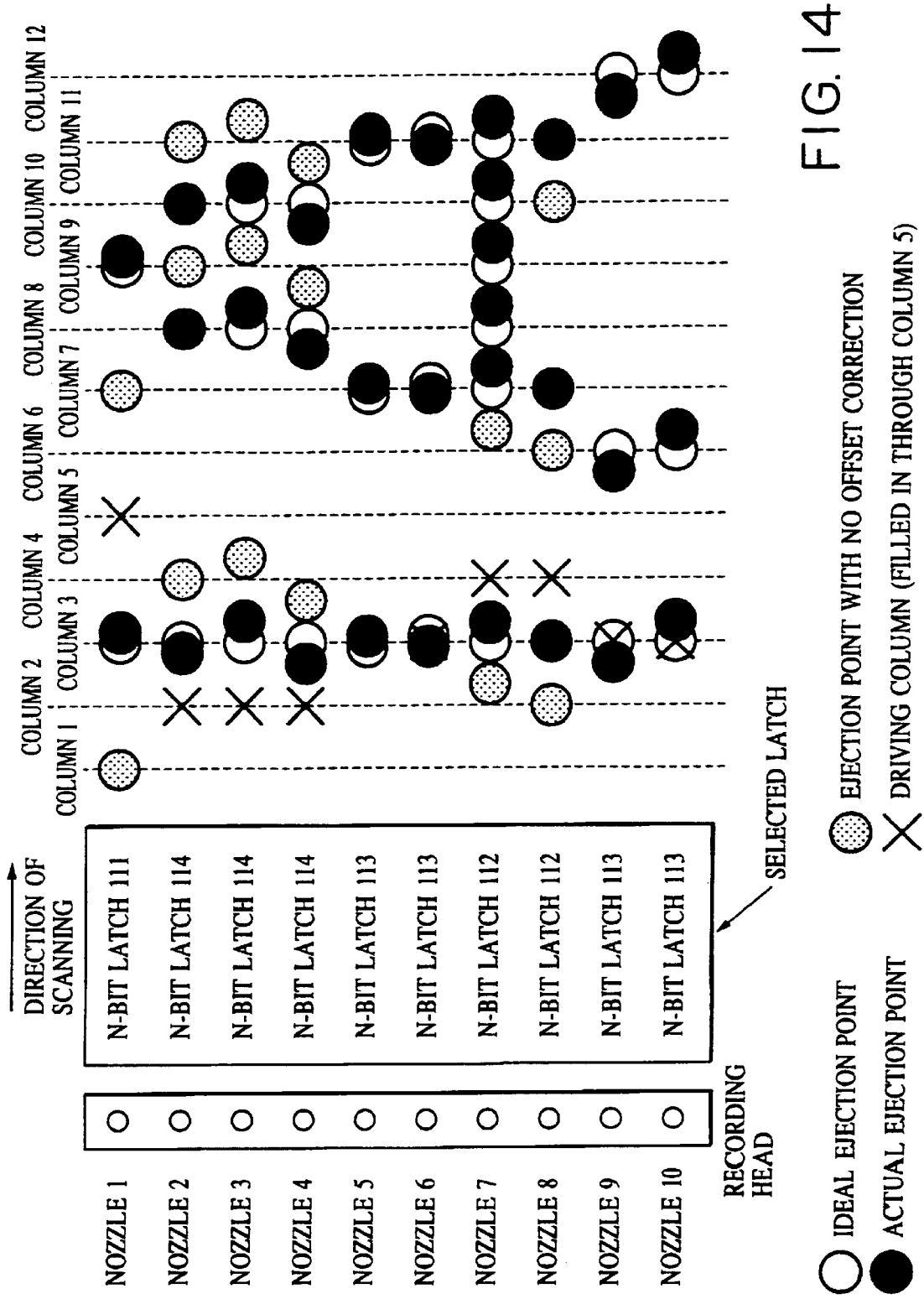
FIG. 14 is a diagram illustrating a dot pattern forming an offset-corrected character pattern "1A"

FIG. 14 is a diagram illustrating a character pattern "1A" recorded by means of the above operations. Incidentally, in this diagram, the number of nozzles of the recording head IJH is shown as 10, for the sake of simplicity in making description. As can be clearly understood from FIG. 14, such correction corrects the discharge position of the ink droplets on the recording paper, and the dot pattern formed as a result is improved in recording quality, even when comparison is made with the pattern shown in FIG. 17.

Thus, according to the above-described embodiment, offset correction data relating to the main scanning direction of the recording head calculated from the recording test pattern is stored in an EEPROM beforehand, and at the time of performing actual recording the correction data is held in a latch circuit built into the correction circuit within the head before the actual recording, so that the recording operation for each nozzle recording input image data is offset in the main scanning direction by several pixels (several columns) based on that correction data, whereby the offset amount in the main scanning direction is corrected in increments of nozzles, consequently performing high-quality recording.

Further, focusing on the recording control, only the number of latch clocks (LCLK 1 through 4) has changed as compared to known recording control, so the present invention is advantageous in that there needs to be no changes at all made regarding the timing of the signals such as the image data transfer clock (CLK), image data (DATA), heat signal (HEAT), block selection signal (BLK 1 through n), and so forth; the only difference is that a plurality of lines of data are buffered in the latches.

Also, with the above embodiment, the correction data was described as being stored in EEPROM, but it is needless to say that the present invention is by no means restricted to such; rather, other devices (such as OTPROM) may be used.

Further, with the above embodiment, the recording head was described as being a recording head which records using the ink-jet method, but it is needless to say that the present invention is by no means restricted to such; rather, the present invention can be applied to recording heads which perform recording according to thermal transfer or thermosensitive methods.

However, although the present invention can be applied to ink-jet apparatuses using piezoelectric devices, applying the present invention particularly to methods using thermal energy generating means (e.g., electro-thermal converters or laser beams, etc.) as energy for discharging ink by applying the thermal energy to the ink and causing a change in state in the ink is even more preferable, as high density and high precision of recording can be achieved.

Regarding basic structures and principles thereof, it is preferable to use the basic principles disclosed in, e.g., U.S. Pat. No. 4,723,129 and U.S. Pat. No. 4,740,796. This method is applicable to both the so-called on-demand type and the continuous type, but particularly with the on-demand type, thermal energy is generated at electro-thermal converters by means of applying at least one driving signal corresponding to recording information to electro-thermal converter positioned corresponding to sheets or liquid paths containing liquid (ink), causing rapid temperature rise which exceeds the point of film boiling, consequently enabling formation of bubbles within the liquid (ink) corresponding with the driving signals in a one-on-one manner. The liquid (ink) is caused to discharge from the discharge orifice owing to expanding and closing of the bubble, thus forming at least one droplet. Arranging the driving signals to be pulses allows for expanding and collapsing of the bubbles in an immediately pertinent manner, so discharge of liquid (ink) with excellent responsivity can be achieved. Thus, this method is even more preferable.

Appropriate pulse-form driving signals are described in U.S. Pat. No. 4,463,359, and U.S. Pat. No. 4,345,262. Employing the conditions for the rate of increase of temperature of the above-described active surface described in U.S. Pat. No. 4,313,124 allows for even more excellent recording.

The present invention also encompasses recording head arrangements wherein the thermal-active surface is positioned in a bent region such as disclosed in U.S. Pat. No. 4,558,333 and U.S. Pat. No. 4,459,000, in addition to the above-described arrangements disclosed in the above patents comprising a combination of orifices, liquid channels, and electro-thermal converters. In addition, an arrangement wherein a common slot is used as the discharge portion for an electro-thermal converter, as to a plurality of electro thermal converters, such as disclosed in Japanese Patent Laid-Open No. 59-123670 or an arrangement involving a construction correlating an orifice for absorbing the pressure wave of thermal energy with the discharge portion such as disclosed in Japanese Patent Laid-Open No. 59-128461, may be employed.

Moreover, regarding full-line type heads having a length corresponding with the width of the maximum size recording medium on which the recording apparatus can record, the construction thereof may either be an arrangement wherein the full length is realized by combining a plurality of recording heads such as disclosed in the above-mentioned patents, or an integrally-formed single recording head.

In addition, the recording head is by no means restricted to a cartridge-type recording head to which an ink tank is integrally provided such as described in the above embodiment; rather, a replaceable chip-type recording head capable of being detachably mounted to the main unit allowing for electrical connection and supplying of ink therefrom, may be used.

Also, it is even more preferable to provide the above-described configuration of the recording apparatus with recording head recovery means, auxiliary means, etc., as such means further improve the stability of the recording operation. Specific examples of such include: capping means for capping the recording head, cleaning means, pressure or suction means, auxiliary heating means comprised of electro-thermal converters or other heating devices, or a combination thereof. Also, providing a preliminary discharge mode for performing discharge separate to recording is effective for stable recording.

Further, regarding the recording mode of the recording apparatus, the apparatus may be provided with at least one of full color by mixing colors or recoloring with different colors, in addition to a recording mode of only a main color such as black, and the recording head in such case may either be integrally formed or be a combination of a plurality of heads.

Although the above embodiment has been described with the ink as a liquid, inks may be used which are solid at room temperature or lower but soften or liquefy at room temperature, or any ink which liquefies under application of recording signals can be used, since general ink-jet methods adjust the temperature of the ink itself between 30° and 70° so that the viscosity of the ink is in a stable discharging range.

In addition, the present invention may also employ types of ink which are of the nature of becoming liquid only when thermal energy is applied, such as in cases where excessive increases in heat are prevented by using the excess heat for changing the state of the ink from a solid state to a liquid state, or, cases where the ink is left in a solid state so as to prevent evaporation; in either case, being such where the ink becomes liquid in response to application of thermal energy recording signals and is discharged as liquid, or such where the ink already begins to solidify by the time it reaches the recording medium. With regard to the present invention, the above-described film-boiling method is most effective regarding the above inks.

Further yet, the form of the recording apparatus relating to the present invention may be such which is integrally or individually provided as an image output terminal of an information processing apparatus such as a computer, or may be a photocopier combined with a reader or the like, or further may be a facsimile apparatus having sending/receiving functions.

Moreover, the present invention may be applied to a system comprised of a plurality of apparatuses (e.g., a host computer, interface device, reader, printer, etc.), or to an apparatus comprised of a single piece of equipment (e.g., photocopier, facsimile, etc.)

As described above, according to the present invention, a plurality of columns of image data corresponding to the plurality of recording devices relating to recording are held and image data corresponding to the column to be recorded is selected from this held image data and recording is thus performed, so that the driving column and recording column can be changed for each nozzle. In this arrangement, correction data prepared beforehand is stored in, e.g., EEPROM, the correction data is output so as to be held in an n number of first N-bit latching circuits, following which the image data is transferred to the recording head in increments of N bits, transmitting a latch clock for each transfer increment, then controlling the image data sequentially transferred to the 2n number of second N-bit latch circuits so as to be held in increments of N-bits, and control is performed so that one piece of data held in the 2n number of second N-bit latch circuits is selected for each of the N number of heat-generating elements based on corrected data stored in the n number of first N-bit latch circuits, and the N number of driving circuits are driven so as to perform recording operation, so that in the event that the array of the heat-generating elements of the recording head are vertical to the scanning direction of the recording head, correction of recording offset can be made to recording offset exceeding the recording resolution in the scanning direction to each of the heat-generating elements, with a simple structure.

Accordingly, in the event that the recording width of a recording head is long, e.g., the recording offset due to warping of the material or irregularities in manufacturing are corrected, allowing for high-quality recording. Further, such correction greatly contributes to improving yield of manufacturing recording heads, thus contributing to reducing manufacturing costs.

What is claimed is:

1. A recording head relatively scanning a recording medium and recording a plurality of columns, said recording head comprising:
   a plurality of recording devices for recording;
   storage means for holding image data for the plurality of columns corresponding with said plurality of recording devices related to the recording;
   a selection circuit for selecting, to adjust offsets of recording dot positions between said plurality of recording devices, from image data corresponding to the plurality of columns stored in said storage means, image data corresponding to a column for which recording is to be performed; and
   driving means for driving said plurality of recording devices, based on the selected image data.

2. A recording head according to claim 1, wherein said selection circuit comprises means for selecting image data of which the recording position offset due to driving of the recording devices has been corrected.

3. A recording head according to claim 1, wherein said recording devices are heat-generating elements.

4. A recording head according to claim 1, wherein discharge orifices for discharging ink and liquid channels are provided corresponding to said recording devices.

5. A recording head according to claim 1, wherein said storage means comprises means for sequentially shifting said column data corresponding to said plurality of recording devices relating to said recording, and holding said data.

6. A recording apparatus to relatively scan a recording medium and to record a plurality of columns, said recording apparatus comprising:
   a plurality of recording devices for recording;
   storage means for holding image data for the plurality of columns corresponding with said plurality of recording devices related to the recording;
   a selection circuit for selecting, to adjust offsets of recording dot positions between said plurality of recording devices, from image data corresponding to the plurality of columns stored in said storage means, image data corresponding to a column for which recording is to be performed;
   a recording head having driving means for driving said plurality of recording devices based on the selected image data; and
   means for supplying image signals to said recording head.

7. A recording apparatus according to claim 6, wherein said selection circuit comprises means for selecting image data of which the recording position offset due to driving of the recording devices has been corrected.

8. A recording apparatus according to claim 6, wherein said recording devices are heat-generating elements.

9. A recording apparatus according to claim 6, wherein discharge orifices for discharging ink and liquid channels are provided corresponding to said recording devices.

10. A recording method for relatively scanning a recording medium with a head having a plurality of recording devices and recording a plurality of columns, said recording method comprising the following steps:
    a step for supplying the plurality of recording devices with corresponding column data;
    a step for storing image data for the plurality of columns in a storage device;

a step for selecting, to adjust offsets of recording dot positions between the plurality of recording devices, from image data corresponding to the plurality of columns stored in the storage device, image data corresponding to a column for which recording is to be performed; and a step for driving the plurality of recording devices based on the selected image data.

11. A recording method according to claim 10, wherein said selection step comprises a step for selecting image data of which the recording position offset due to driving of the recording devices has been corrected.

12. A recording method according to claim 10, wherein said recording devices are heat-generating elements.

13. A recording method according to claim 10, wherein ink is discharged from discharge orifices by driving of said recording devices.

14. A recording method according to claim 10, wherein said column data corresponding to said plurality of recording devices relating to recording which has been stored in said storage device, is sequentially shifted and stored.

15. A recording head comprising:

an N number of heat-generating elements arrayed in one row;

an N number of driving circuits for driving said heat-generating elements;

an N-bit shift register which temporarily stores N bits of image data;

an n number of first N-bit latch circuits for storing correction data prepared for correcting array offsets of said N number of heat-generating elements;

a 2n number of second N-bit latch circuits for holding a 2n×N bits of image data stored in said N-bit shift register; and a control circuit for performing control so that one piece of image data held in said 2n number of second N-bit latch circuits is selected for each of said N number of heat-generating elements based on corrected data stored in said first N-bit latch circuit to adjust for the array offsets of said N number of heat-generating elements, and said N number of driving circuits are driven so as to perform a recording operation.

16. A recording head according to claim 15, further comprising an EEPROM for storing said correction data.

17. A recording head according to claim 15, wherein n includes "2".

18. A recording head according to claim 17, wherein said control circuit further comprises a selector for selecting one piece of data from the image data held by four of said second N-bit latch circuits corresponding with each of an N number of heat-generating elements, based on correction data expressed in 2 bits regarding each of the N number of heat-generating elements stored in two of said first N-bit latch circuits.

19. A recording head according to claim 15, wherein said recording head comprises an ink-jet recording head which records by discharging ink.

20. A recording head according to claim 15, wherein said recording head records by discharging ink using thermal energy, said recording head further comprising a thermal energy converter for generating thermal energy to apply to the ink.

21. A recording head according to claim 15, wherein said 2n number of second N-bit latch circuits are serially connected, and transfer N-bits of image data to the neighboring circuit each time a latch clock is input.

22. A recording head according to claim 15, wherein said correction data is generated by mounting said recording head to an external device, test-recording a predetermined pattern, and subjecting said recorded pattern to image processing.

23. A recording apparatus which records by using the recording head according to claim 15, said recording apparatus comprising:

scanning means for reciprocally moving said recording head in a first direction;

transporting means for transporting a recording medium in a second direction in which the heat generating elements of said recording head are arrayed and which is orthogonal to said first direction;

correction data setting means for outputting said correction data to said n number of first N-bit latch circuits for holding, before the recording operation;

transferring means for transferring said image data to said recording head in increments of N bits; and hold control means for performing control such that a latch clock is transmitted for each transfer increment by said transfer means and such that image data sequentially transferred to said 2n number of second N-bit latch circuits is held in increments of N bits.

24. A recording apparatus according to claim 23, wherein said correction data is data which instructs shifting of the recording position in said first direction, in increments of said recording head heat-generating elements.

25. A recording apparatus according to claim 24, wherein each increment is the size of one recording dot determined by a recording solution in said first direction.

26. A recording apparatus according to claim 23, further comprising an EEPROM for storing said correction data.

27. A recording apparatus according to claim 23, further comprising:

test operation control means for controlling said recording head to record a predetermined pattern on the recording medium;

reading means for reading the recorded pattern from the recording medium upon which said pattern has been recorded;

image processing means for performing image processing to the data read by said reading means; and generating means for generating correction data based on the results of said image processing means.

28. A recording apparatus according to claim 27, said reading means further comprising:

light-emitting means for irradiating light upon said recording medium; and light-receiving means for receiving reflected light from the recording medium and converting the reflected light into electric signals.

29. A recording control method which controls recording by using a recording head comprising an N number of heat-generating elements arrayed in one row, an N number of driving circuits for driving the heat-generating elements, an N-bit shift register which temporarily stores N bits of image data, an n number of first N-bit latch circuits for storing correction data prepared for correcting array offsets of the N number of heat-generating elements, and a 2n number of second N-bit latch circuits for holding 2n×N bits of image data stored in the N-bit shift register, said recording method comprising the following steps:

a correction data setting step for outputting the correction data to the n number of first N-bit latch circuits for holding, before a recording operation;

a transferring step for transferring the image data to the recording head in increments of N bits;

a hold control step for performing control such that a latch clock is transmitted for each transfer increment by said transferring step, and such that image data sequentially transferred to the 2n number of second N-bit latch circuits is held in increments of N bits; and a recording control step for performing control so that one piece of image data held in the 2n number of second N-bit latch circuits is selected for each of the N number of heat-generating elements based on correction data stored in the n number of first N-bit latch circuits to adjust for the array offsets of the N number of heat-generating elements, and the N number of driving circuits are driven so as to perform the recording operation.

30. A recording head which comprising:

an N number of recording devices arrayed in one row;

a holding circuit for holding image data for a plurality of rows of said N number of recording devices;

a memory circuit which stores correction data relating to offsets between recording dots recorded by said N number of recording devices; and a control circuit for performing control so that one piece of data held in said holding circuit is selected from said plurality of rows of image data held in said holding circuit for each of said N number of recording devices, based on corrected data stored in said memory circuit to adjust for the offsets between the recording dots recorded by said N number of recording devices, and said N number of recording devices are driven so as to perform a recording operation.

31. A recording head according to claim 30, wherein said memory circuit further comprises an EEPROM.

32. A recording head according to claim 30, wherein said recording head comprises an ink-jet recording head which records by discharging ink.

33. A recording head according to claim 30, wherein said recording head comprises a recording head which records by discharging ink using thermal energy, said recording head further comprising a thermal energy converter for generating thermal energy to apply to the ink.

34. A recording head cartridge comprising a recording head according to one of claims 1, 15, and 30, and an ink container for holding ink to supply to said recording head.

* * * * *

UNITED STATES PATENT AND TRADEMARK OFFICE
CERTIFICATE OF CORRECTION

PATENT NO. : 6,168,251 B1
DATED : January 2, 2001
INVENTOR(S) : Imanaka et al.

Page 1 of 1

It is certified that error appears in the above-identified patent and that said Letters Patent is hereby corrected as shown below:

<u>Title page,</u>
ABSTRACT,
Line 2, "which are" should be deleted.
Line 3, "capable" should read -- which are capable --.

<u>Column 6,</u>
Line 7, "means" should read -- data --, and "data;" should read -- means; --.

<u>Column 19,</u>
Line 17, "which" should be deleted.

Signed and Sealed this

Second Day of April, 2002

*Attest:*

JAMES E. ROGAN
*Attesting Officer*  *Director of the United States Patent and Trademark Office*